US012737005B2

(12) United States Patent
Min et al.

(10) Patent No.: US 12,737,005 B2
(45) Date of Patent: Sep. 15, 2026

(54) FLEXIBLE ELECTRONIC DEVICE AND METHOD FOR CONTROLLING DISPLAY OF APPLICATION EXECUTION SCREEN

(71) Applicant: Samsung Electronics Co., Ltd., Gyeonggi-do (KR)

(72) Inventors: Byungwoo Min, Gyeonggi-do (KR); Myunghoon Kwak, Gyeonggi-do (KR); Jookwan Lee, Gyeonggi-do (KR); Yangwook Kim, Gyeonggi-do (KR); Jihea Park, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 351 days.

(21) Appl. No.: 18/209,749

(22) Filed: Jun. 14, 2023

(65) Prior Publication Data

US 2023/0324955 A1 Oct. 12, 2023

Related U.S. Application Data

(63) Continuation of application No. PCT/KR2022/014186, filed on Sep. 22, 2022.

(30) Foreign Application Priority Data

Oct. 8, 2021 (KR) ........................ 10-2021-0133970

(51) Int. Cl.
*G06F 3/04886* (2022.01)
*G06F 1/16* (2006.01)
*H04M 1/02* (2006.01)

(52) U.S. Cl.
CPC ........ *G06F 1/1624* (2013.01); *G06F 3/04886* (2013.01); *H04M 1/0237* (2013.01)

(58) Field of Classification Search
CPC .. G06F 1/1624; G06F 3/04886; G06F 1/1652; G06F 1/1677; G06F 3/0481;
(Continued)

(56) References Cited

U.S. PATENT DOCUMENTS 5,557,728 A * 9/1996 Garrett .................... G06T 11/60
707/E17.03
5,577,728 A * 11/1996 Kondo .................. A63F 9/0613
273/157 R
(Continued)

FOREIGN PATENT DOCUMENTS

CN 109508136 A 3/2019
EP 2763034 A1 8/2014
(Continued)

OTHER PUBLICATIONS

Extended European Search Report dated Nov. 4, 2024.
(Continued)

*Primary Examiner* — Towfiq Elahi
(74) *Attorney, Agent, or Firm* — CANTOR COLBURN LLP

(57) ABSTRACT

According to certain embodiments, an electronic device further comprises: a first housing; a second housing slidably coupled with respect to the first housing; a display in which an viewable area to an outside of the electronic device is changeable from a first size to a second size according to a sliding distance of the second housing with respect to the first housing; a memory storing computer-executable instructions; and a processor configured to access the memory and execute the computer-executable instructions, wherein execution of the computer-executable instructions by the processor causes the processor to perform a plurality of operations, the plurality of operations comprising: in response to receiving a first input requesting a recent task list of at least one application being serviced when the viewable
(Continued)

area has the first size, display at least one execution screen image having a first aspect ratio for the first size corresponding to the at least one application; and when the viewable area has the second size, displaying the at least one execution screen image having a second aspect ratio for the second size.

20 Claims, 15 Drawing Sheets

(58) Field of Classification Search
CPC ......... G06F 3/0483; G06F 2203/04803; G06F 3/0482; G06F 3/04845; H04M 1/0237; H04M 1/0268; H04M 1/72454; H04M 1/0241; G09G 2340/04
See application file for complete search history.

(56) References Cited

U.S. PATENT DOCUMENTS

| | | | | |
|---|---|---|---|---|
| 9,262,059 | B2 | 2/2016 | Kim et al. | |
| 10,007,475 | B2 | 6/2018 | Jeon et al. | |
| 10,838,596 | B2 | 11/2020 | Qian et al. | |
| 11,036,387 | B2 | 6/2021 | Karunamuni et al. | |
| 11,244,658 | B1 | 2/2022 | Hong et al. | |
| 2006/0012716 | A1* | 1/2006 | Choi | G06T 3/606 348/588 |
| 2007/0258010 | A1* | 11/2007 | Hong | H04N 21/426 348/E5.112 |
| 2010/0056223 | A1* | 3/2010 | Choi | G06F 1/1686 455/566 |
| 2013/0201208 | A1* | 8/2013 | Cho | G06F 3/0488 345/619 |
| 2013/0234951 | A1 | 9/2013 | Kim et al. | |
| 2014/0137041 | A1 | 5/2014 | Jeon et al. | |
| 2014/0237405 | A1 | 8/2014 | Wu | |
| 2014/0340299 | A1* | 11/2014 | Lee | G06F 3/147 345/156 |
| 2016/0034047 | A1 | 2/2016 | Lee et al. | |
| 2016/0134925 | A1* | 5/2016 | Lee | H04N 5/45 725/38 |
| 2017/0140504 | A1* | 5/2017 | Jeong | G06F 3/147 |
| 2017/0147189 | A1* | 5/2017 | Ryu | G06F 3/04886 |
| 2017/0154609 | A1 | 6/2017 | Yoon et al. | |
| 2017/0186132 | A1* | 6/2017 | Lee | G06F 1/1694 |
| 2018/0188910 | A1* | 7/2018 | Ko | G06F 1/1652 |
| 2018/0246634 | A1* | 8/2018 | Suh | G06F 3/1423 |
| 2019/0121503 | A1 | 4/2019 | Chaudhri | |
| 2019/0261519 | A1* | 8/2019 | Park | H04M 1/0235 |
| 2019/0346954 | A1* | 11/2019 | Jung | G06F 3/0416 |
| 2021/0089173 | A1 | 3/2021 | Han et al. | |
| 2022/0091905 | A1 | 3/2022 | Lee et al. | |
| 2022/0139357 | A1 | 5/2022 | Hong et al. | |
| 2022/0148473 | A1 | 5/2022 | Kim et al. | |
| 2023/0038834 | A1 | 2/2023 | Kang et al. | |

FOREIGN PATENT DOCUMENTS

| | | | |
|---|---|---|---|
| KR | 10-2017-0069103 | A | 6/2017 |
| KR | 10-2018-0080629 | A | 7/2018 |
| KR | 10-2020-0051768 | A | 5/2020 |
| KR | 10-2020-0094829 | A | 8/2020 |
| KR | 10-2206948 | B1 | 1/2021 |
| KR | 10-2289412 | B1 | 8/2021 |
| KR | 10-2022-0061801 | A | 5/2022 |
| WO | 2018/213451 | A1 | 11/2018 |
| WO | 2021/141153 | A1 | 7/2021 |

OTHER PUBLICATIONS

Korean Office Action issued in Korean Application No. 10-2021-0133970; Report Mail Date Dec. 16, 2026 (11 Pages—with English Translation).

Indian Office Action for Indian Application No. 202417026394; Report Mail Date May 20, 2026 (9 Pages).

Korean Office Action issued in Korean Application No. 10-2021-0133970; Report Mail Date Jul. 3, 2026 (7 Pages—with English Translation).

* cited by examiner

FLEXIBLE ELECTRONIC DEVICE AND METHOD FOR CONTROLLING DISPLAY OF APPLICATION EXECUTION SCREEN

CROSS REFERENCE TO RELATED APPLICATION(S)

This application is a continuation of International Application No. PCT/KR2022/014186 filed on Sep. 22, 2022, which claimed priority to Korean Patent Application No. KR-10-2021-0133970 filed on Oct. 8, 2021 in the Korean Intellectual Property Office, the disclosures of which are herein incorporated by reference.

BACKGROUND

Technical Field

Certain embodiments relate to a flexible electronic device and a method for controlling display of an application execution screen.

Description of Related Art

A common dilemma with electronic devices is portability and screen size. It is generally desirable for the electronic device to be portable, and capable of being carried in the user's pocket or purse. In order to be portable, the electronic device generally need to have small dimensions. However, if the electronic device has small dimensions, the screen size is also small and can be difficult for the user to view.

However, a flexible electronic device would allow for both portability and a large screen. While the user is carrying the electronic device, the user could reduce its dimensions. This is acceptable because the user would not likely to be viewing the screen while carrying the electronic device. When the user is actually viewing the electronic device, the user would increase the screen size.

In a flexible electronic device, a flexible display would be disposed in a space formed by a first housing and a second housing, and the display would be expanded or reduced by a sliding motion between the first housing and the second housing. Accordingly, in the display of the flexible electronic device, an active region in which visual information is to be displayed may be reduced or expanded.

Multi-tasking would allow simultaneous execution of multiple applications. An app card view would provide a recent task (or recent screen, recent app) list of activities and tasks while multi-tasking. For example, an app card view could provide a list of currently executing application when the user is multi-tasking.

A recent task list could list execution screens of applications running (or being serviced) in an electronic device. A user may search the recent task list to select a task (or application) to be restarted, or delete the same from the recent task list to end an application service.

As each of the execution screens (or app cards or recent cards) listed in the recent task list, instead of real-time data updated through execution of an application service, an image could be obtained by capturing the last execution screen when the application is switched from the foreground to the background.

An electronic device may maintain a state in which display data from the last execution screen at a time point of capturing is temporarily stored in a buffer and, when an execution screen is selected from a recent task list, execute an application service by switching an execution screen based on the display data stored in the buffer to the foreground.

A flexible electronic device having a changeable display size could adaptively apply different menus and layout configurations based on a changing display size. For example, with respect to the same application, an electronic device could support a function of displaying the application in a first layout when the display has a first size, and displaying the application in a second layout configuration when the display has a second size.

However, an electronic device may use an execution screen that was captured in a different size different from the current display size in a recent task list. The foregoing would be a problem in that the last execution screen that would be used in a recent task list, could not be changed in the recent task list.

For example, when the size of an execution screen of a stored recent task list is different from the current display size, a layout execution screen different from a layout being displayed in the recent task list would be executed. In this process, an application (or a non-resizable app), for which layout resizing is not possible, may have to be re-launched. Relaunching would discard a previously stored execution screen. As a result, data related to an application currently being serviced is initialized and lost.

Alternatively, after the display size is reduced, an execution screen from when the display size is large may be provided in a different aspect ratio in a recent task list. This could result in a partially cut off image therein, or display data is displayed in a small size with a reduced entire image. This causes a problem in that a user might not accurately recognize information on an execution screen when trying to search for the information from a recent task list.

Alternatively, when a display is changed, an execution screen stored in a recent task list in a multi-window environment has a problem in that a part of the execution screen would be cut off when there is a difference from the current display size, and there is no method for switching only one execution screen among multiple windows to the foreground.

Certain embodiments are to provide a method for updating an execution screen of a recent task list by reflecting a state in which a display size is changed, or changing the display size according to the size of the execution screen.

SUMMARY

According to certain embodiments, an electronic device further comprises: a first housing; a second housing slidably coupled with respect to the first housing; a display in which an viewable area to an outside of the electronic device is changeable from a first size to a second size according to a sliding distance of the second housing with respect to the first housing; a memory storing computer-executable instructions; and a processor configured to access the memory and execute the computer-executable instructions, wherein execution of the computer-executable instructions by the processor causes the processor to perform a plurality of operations, the plurality of operations comprising: in response to receiving a first input requesting a recent task list of at least one application being serviced when the viewable area has the first size, display at least one execution screen image having a first aspect ratio for the first size corresponding to the at least one application; and when the viewable area has the second size, displaying the at least one execution screen image having a second aspect ratio for the second size.

According to certain embodiments, a method for controlling display of an application execution screen of an electronic device, comprises: in response to receiving a first input on a display in which an viewable area to an outside of the electronic device is changeable from a first size to a second size according to a sliding distance of a second housing with respect to a first housing, while the viewable area has the first size, receiving a first input for requesting a recent task list of at least one application being serviced, displaying a at least one execution screen image having a first aspect ratio for the first size corresponding to at least one application being serviced; and when the viewable area has the second size, displaying the at least one execution screen image having a second aspect ratio for the second size.

DETAILED DESCRIPTION

Various embodiments may reflect display size change information in a recent task list in real time, so as to provide the last executed application information to a user through the recent task list without omission even when a display size is changed, thereby improving the convenience. In some cases, various embodiments may automatically change a display size to correspond to the size of an execution screen provided to a recent task list, thereby improving the usability of a recent task list function.

Certain embodiments may reflect display size change information in a recent task list in real time, so as to provide the last execution application information to a user through the recent task list without omission even when a display size is changed, thereby improving the convenience. In some cases, certain embodiments, may automatically change a display size to correspond to the size of an execution screen provided to a recent task list, thereby improving the usability of a recent task list function.

Certain embodiments include an electronic device that allows a user to multi-task. Multi-tasking allows a user to utilize multiple applications. Generally, one application is executed in the foreground while other applications are executed in the background. The application that is executed in the foregoing is the application that the use is actively using, or the most recently actively using. When the user switches to actively using another application, that application becomes the foreground application, and the previous application becomes a background application.

When an application is moved from the foreground to the background, the most recent application display screen is captured in memory. In certain embodiments, the user can view all of the application display screens of all of the background applications that are currently in use.

However, certain application display screens may have been captured with a certain display size that is different from the current display size. According to certain embodiments, the application display screens that were captured with the different size can be reconfigured to the aspect ratio of the current display size. Accordingly, when the user views each of the application display screens of all of the background application currently in use, the application display screens are based on the current display size.

Figure 1:
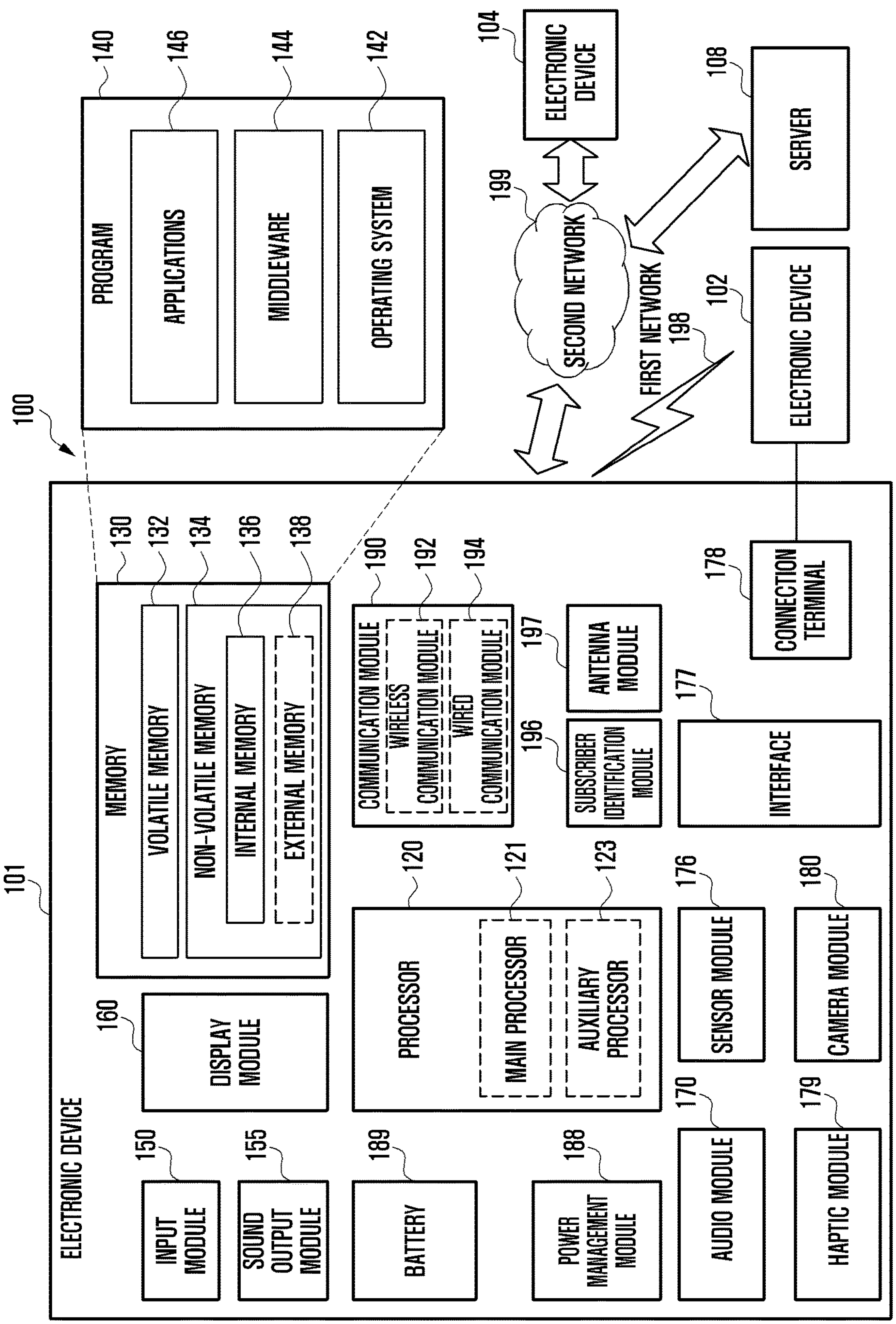
FIG. 1 is a block diagram illustrating an electronic device in a network environment according to an embodiment of the disclosure.
Figure 2A:
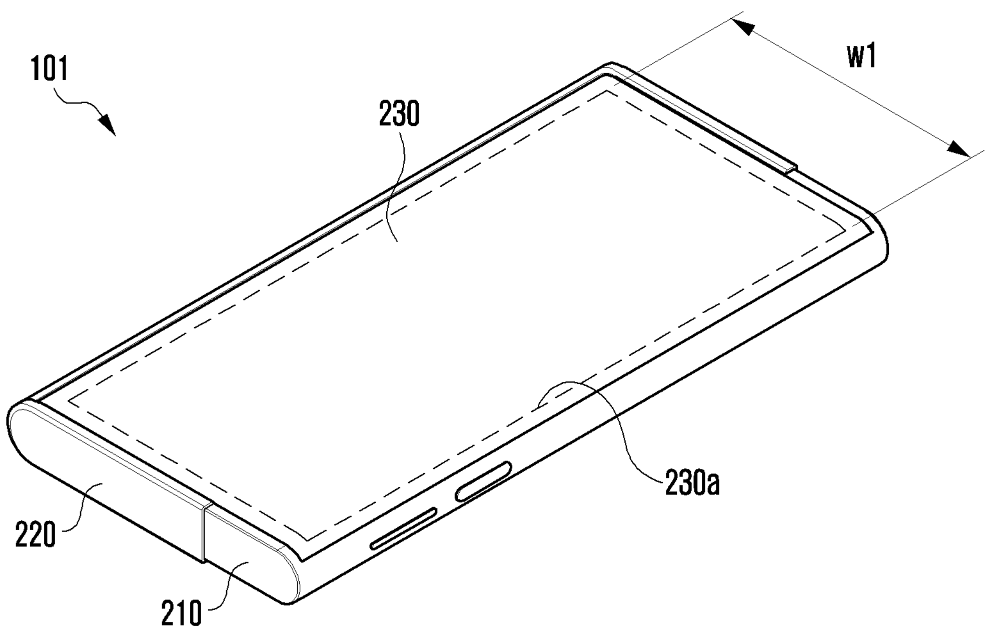
FIGS. 2*a*, 2*b* and 2*c* illustrate configurations of flexible electronic device according to an embodiment
Figure 2B:
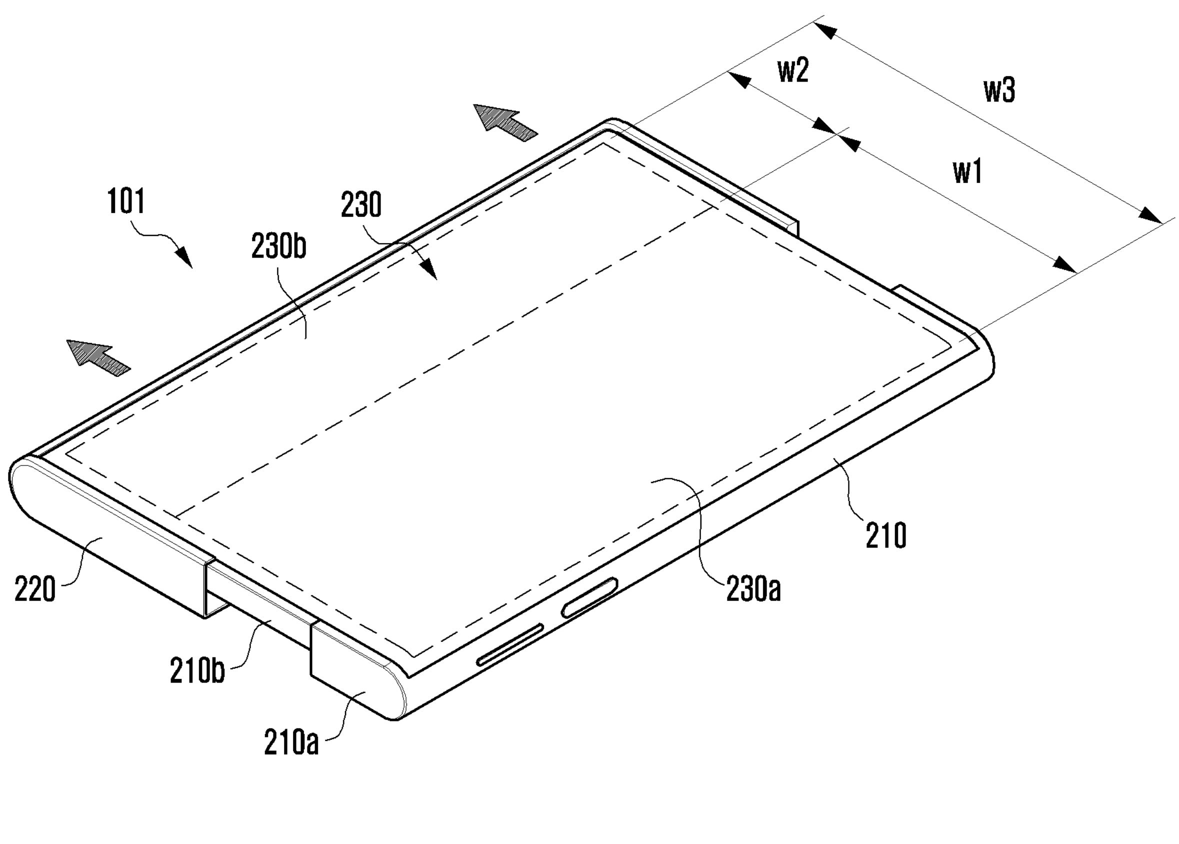
Figure 2C:
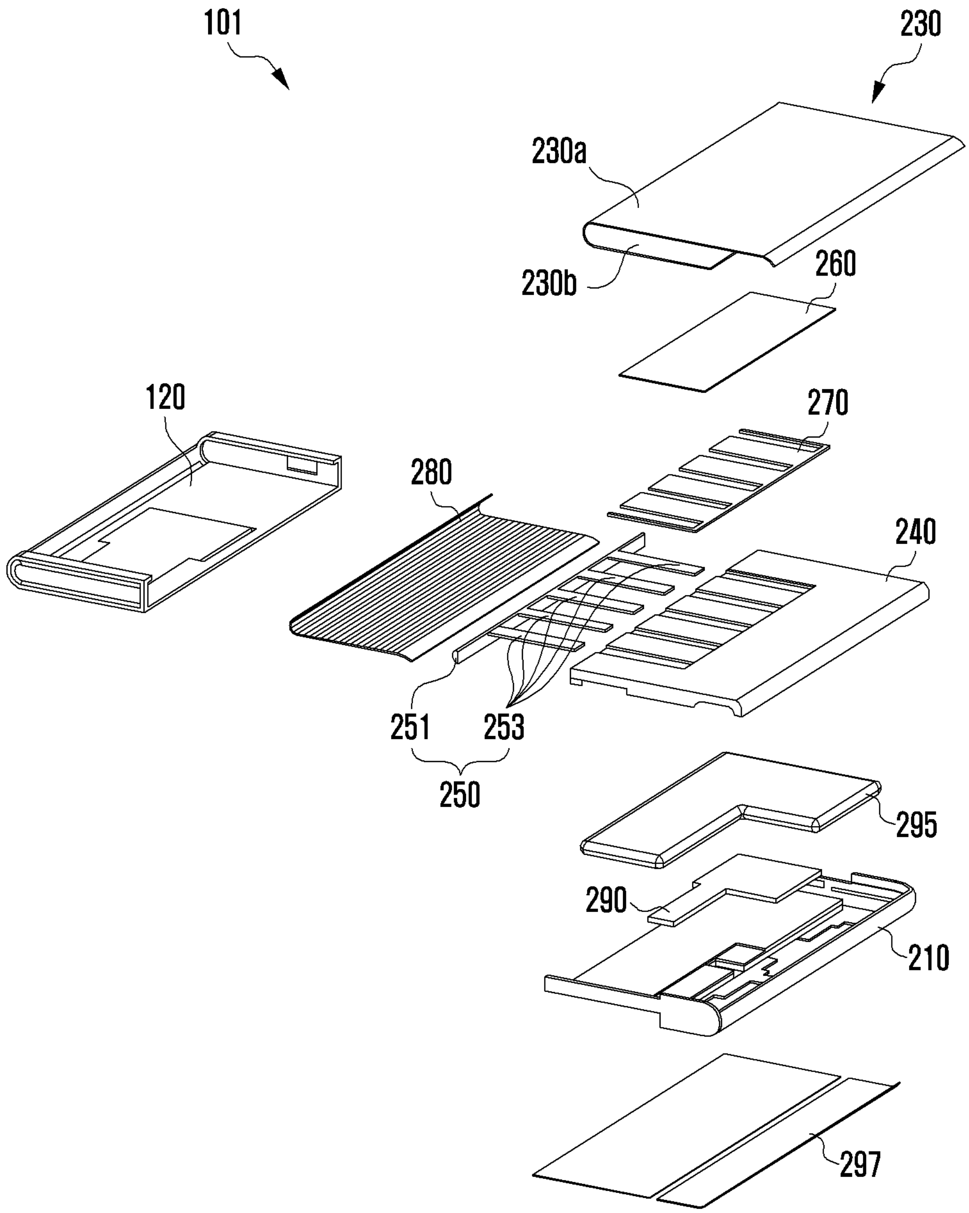

FIG. 1 describes an electronic device, while FIGS. 2A-2C describe a housing of an electronic device with a flexible display size.

Electronic Device

The electronic device according to certain embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The term "processor" shall be understood to refer to both the singular and plural context in this document.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GINO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2*a* is a perspective view showing an electronic device which is in a first state (e.g., a retracted state (slide-in state)) according to certain embodiments of the disclosure, FIG. 2*b* is a perspective view showing the electronic device which is in a second state (e.g., an extended state (slide-out state)) according to certain embodiments of the disclosure, and FIG. 2*c* is an assembled perspective view in which the electronic device according to certain embodiments is disassembled.

For example, the first state may be called a normal state, a reduced state, a collapsed state, a retracted state, a closed state, or a slide-in state, and the second state may be called an extended state, an opened state, or a slide-out state. Further, according to an embodiment, the electronic device 101 may be in a third state which is a state between the first state and the second state. For example, the third state may be called a third shape, and the third shape may be called a free-stop state.

Housing of an Electronic Device with a Flexible Display

Referring to FIGS. 2*a*, 2*b* and 2*c*, the electronic device 101 according to certain embodiments of the disclosure may include a first housing 210 and a. According to an embodiment, the second housing 220 may move in a designated direction, for example, a first direction (x direction), from the first housing 210. For example, the second housing 220 may slide a designated distance (e.g., a second width (w2)) in the first direction (x direction) from the first housing 210. According to an embodiment, the second housing 220 may reciprocate the designated distance (e.g., a second width (w2)) in the first direction (x direction) from the first housing 210 and a second direction (−x direction).

In certain embodiments of the disclosure, a state in which the second housing 220 has slid in the first direction (x direction) from the first housing 210 may be defined as a second state (e.g., an extended state) (or a slide-out state) of the electronic device 101. In certain embodiments of the disclosure, a state in which the second housing 220 has slid toward the first housing 210, for example, in the second direction (−x direction) opposite to the first direction (x direction) may be defined as a first state (e.g., a retracted state) (or slide-in state) of the electronic device 101.

The electronic device 101 according to certain embodiments of the disclosure may be switched to the first state (e.g., the reduced state) and/or the second state (e.g., the extended state) manually by a user or automatically through a driving mechanism (e.g., a driving motor, a speed-reducing gear module, and/or a gear assembly) disposed in the first housing 210 or the second housing 220. According to an embodiment, operation of the driving mechanism may be triggered based on a user input. According to an embodiment, the user input for triggering the operation of the mechanism may include a touch input, a force touch input, and/or a gesture input through a display 130. In another embodiment, the user input for triggering the operation of the mechanism may include a voice input, an input of a physical button exposed to the outside of the first housing 210 or the second housing 220, or a user gesture that moves the display 230 in a designated direction (e.g., the first direction (x direction)) while pressing a portion of the display 230, which is visually exposed to the outside.

According to an embodiment, the electronic device 101 may be called a slidable electronic device because the second housing 220 can slide, or may be called a rollable electronic device because the rollable display 230 is at least partially configured to be rolled, based on sliding of the second housing 220, in the second housing 220 (or the first housing 210). According to an embodiment, the electronic device 101 may include a foldable electronic device and/or a stretchable electronic device. For example, "the foldable electronic device", "the slidable electronic device", "the stretchable electronic device" and/or "the rollable electronic device" may imply an electronic device in which the bending deformation of the rollable display 230 is possible, and thus at least a portion thereof can be folded or can be wound or rolled, or the region thereof can be at least partially extended and/or can be received in a housing (e.g., the first housing 210 or the second housing 220). The foldable electronic device, the slidable electronic device, the stretchable electronic device, and/or the rollable electronic device may extend and use a screen display region by unfolding a display or exposing the wider area of the display to the outside according to a user' need.

According to an embodiment, in the electronic device 101, the second housing 220 may be coupled to the first housing 210 so as to at least partially slide from the first housing 210.

According to an embodiment, the first housing 210 of the electronic device 101 may include side members 210*a* and 210*b* surrounding the side surface of the electronic device 101. According to an embodiment, the side members 210*a* and 210*b* of the first housing 210 may include: a first side member 210*a* which is exposed to the outside without being inserted into the second housing 220 in the first state (e.g., the retracted state) and/or the second state (e.g., the extended state) of the electronic device 101; and a second side member 210*b*, at least a portion of which is inserted into and/or drawn out of the inner space of the second housing 220 through one side surface of the second housing 220. For example, the second side member 210*b* of the first housing 210 may not be visually exposed to the outside in the first state (e.g., the retracted state), but may be visually exposed to the outside in the second state (e.g., the extended state).

According to another embodiment, although not illustrated, according to an embodiment, the entirety or at least a part of the second housing 220 may be inserted into and/or drawn out of the first housing 210. For example, although not illustrated, when the second housing 220 slides in the first direction (x direction), a portion of the second housing 220 may be drawn out of the inner space of the first housing 210. For example, although not illustrated, when the second housing 220 slides in the second direction (−x direction)

opposite to the first direction (x direction), the portion of the second housing 220 may be inserted into the inner space of the first housing 210 and may not be visually exposed to the outside.

According to an embodiment, the second housing 220 may support a portion (e.g., a second portion 230*b*) of the display 230, and may extend or reduce the display area of the display 230 depending on sliding of the second housing 220.

According to certain embodiments, the electronic device 101 may include the display 230 disposed to be supported by the first housing 210 and the second housing 220.

According to an embodiment, the display 230 may include: a first portion 230*a* supported by the first housing 210 and a second portion 230*b* extending from the first portion 230*a* and supported by a bendable member 280.

According to an embodiment, the second portion 230*b* of the display 230 may be disposed such that, when the electronic device 101 is in the first state (e.g., the retracted state), the second portion 230*b* is inserted into the inner space of the second housing 220 (or the first housing 210) and is not visually exposed to the outside. When the electronic device 101 is in the second state (e.g., the extended state), the second portion 230*b* of the display 230 may be exposed to the outside so as to extend from the first portion 230*a* while being supported by the bendable member 280.

According to an embodiment, in the first state (e.g., the retracted state), the first portion 230*a* of the display 230 is visually exposed, and thus the display area of the display 230 may have a first width (w1).

According to an embodiment, in the second state (e.g., the extended state), the first portion 230*a* and the second portion 230*b* of the display 230 are exposed, and thus the display area of the display 230 may have a third width (w3) that is larger than the first width (w1) by the second width (w2). For example, in the second state (e.g., the extended state), the display area of the display 230 may be extended by the second width (w2) that is the maximum width of the second portion 230*b*.

In certain embodiments of the disclosure, the first portion 230*a* of the display 230 may be always visually exposed to the outside regardless of the movement of the second housing 220, and thus may be defined as a "fixed display region". In certain embodiments of the disclosure, the second portion 230*b* of the display 230 is exposed to the outside or is inserted into the second housing 220 (or the first housing 210) and is not visually exposed to the outside, based on the movement of the second housing 220, and thus may be defined as a "variable display region".

According to certain embodiments, although not illustrated, the electronic device 101 may include a sensor module (e.g., the sensor module 176 in FIG. 1) or a camera module (e.g., the camera module 180 in FIG. 1).

According to an embodiment, the sensor module (e.g., an illumination sensor) may be disposed below the display 230 (e.g., in the −z direction from the display 230), and may detect an external environment on the basis of information (e.g., light) received through the display 230.

According to an embodiment, the sensor module may include at least one among a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, an illumination sensor, a proximity sensor, or an ultrasonic sensor.

According to an embodiment, the camera module may include one lens or at least two lenses (e.g., a wide-angle lens, an ultra wide-angle lens, or a telephoto lens) and image sensors. In an embodiment, the camera module may include an infrared (IR) camera (e.g., a time-of-flight (TOF) camera or a structured light camera), or a light detection and ranging (LiDAR) sensor. For example, the camera module may include an image sensor and/or lenses for time-of-flight (TOF). According to an embodiment, the IR camera may operate as at least a part of the sensor module, and the TOF camera may operate as at least a part of a sensor module for sensing the distance between the camera module and a subject.

According to an embodiment, a bracket 240, a battery 295, and/or a substrate 290 (e.g., a printed circuit board (PCB), a flexible PCB (FPCB), or a rigid-flexible PCB (RFPCB) may be disposed in the first housing 210.

According to an embodiment, a support plate 260 may be seated on a portion of the front surface of the bracket 240. According to an embodiment, the support plate 260 may be coupled to a portion (e.g., the first recess 312*a*) of the front surface of the bracket 240 by the adhesive member 270. According to an embodiment, the support plate 260 may support a portion (e.g., the first portion 130*a*) of the display 230 at the portion (e.g., the first recess 230*a*) of the front surface of the bracket 240 coupled to a sliding support member 250.

According to an embodiment, the bracket 240 may be formed integrally with the first housing 210. According to another embodiment, the bracket 240 may be disposed as a component that is different from the first housing 210. In this case, the bracket 240 may be coupled to the first housing 210 by being assembled with a portion of the first housing 210.

According to an embodiment, the bracket 240 may be formed of, for example, a metal material and/or a non-metal (e.g., polymer) material. According to an embodiment, the bracket 240 may support a portion (e.g., the first portion 230*a*) of the display 230 through the front surface (e.g., in the +z direction) of the bracket 240.

According to an embodiment, a processor (eg, the processor 120 of FIG. 1) and a memory (eg, the memory 130 of FIG. 1) may be mounted on the substrate 290.

According to an embodiment, an antenna (not shown) may be disposed in the first housing 210. For example, the antenna may be disposed between the bracket 240 and a rear cover 297 the first housing 210. The antenna may include, for example, a near-field communication (NFC) antenna, a wireless charging antenna, and/or a magnetic secure transmission (MST) antenna. The antenna, for example, may perform short-range communication with an external device or may transmit or receive power to or from the external device in a wireless manner.

According to an embodiment, the rear surface of the first housing 210 (e.g., a surface of the first housing 210 facing a −z direction) may be coupled to the rear cover 380. According to an embodiment, the rear cover 380 may be formed of a substantially opaque material. According to an embodiment, the rear cover 297 may be formed of, for example, coated or colored glass, ceramic, polymer, metal (e.g., aluminum, stainless steel, or magnesium), or a combination of at least two of the materials. According to an embodiment, the rear cover 297 may be coupled to side members (e.g., the side members 210*a* and 210*b* in FIG. 2) of the first housing 210, or may be integrated with the side members 210*a* and 210*b* of the first housing 210.

Although not illustrated, the electronic device 101 may further include a second rear cover (not shown) coupled to the rear surface (e.g., a surface of the second housing 220 facing a −z direction) of the second housing 220. In this case, the second rear cover may be formed of a material that is substantially identical to that of the rear cover 297.

According to an embodiment, a sliding support member 250 or a bendable member 280 may be disposed in the second housing 220.

According to an embodiment, the sliding support member 250 may include: multiple sliding bars (or ribs) 253 which are arranged in a first direction (x direction); and a support bar 251 which connects, at one end thereof, the multiple sliding bars 253 to each other and is arranged in a third direction (y direction) perpendicular to the first direction (x direction). According to an embodiment, the multiple sliding bars 253 may be disposed while being spacing apart from each other, and the support bar 251 may be disposed at one-side ends of the multiple sliding bars 253. According to an embodiment, the support bar 251 may have a rod shape or a cylindrical shape arranged in the third direction (y direction).

According to an embodiment, the electronic device 101 may include the bendable member 280 (or bendable support member) (e.g., multi joint hinge module) which is coupled to the end of the second housing 220, supports at least a portion of the display 230, and is capable of being bent. According to an embodiment, when the second housing 220 slides in the first housing 210, the bendable member 280 may be at least partially inserted into or drawn out of the inner space of the second housing 220 while supporting the display 230.

According to an embodiment, the bendable member 280 may be inserted into or drawn out of the inner space of the second housing 220 on the basis of the movement or rotation of the sliding support member 250 disposed in the second housing 220.

Although not illustrated, according to another embodiment, the bendable member 280 may be coupled to the end of the first housing 210. For example, the bendable member 280 may be drawn out of the inner space of the first housing 210 according to sliding of the second housing 220 in the first direction (x direction), and may be inserted into the inner space of the first housing 210 according to sliding of the second housing 220 in a second direction (−x direction).

The electronic device 101 according to certain embodiments may omit at least one of the described components or additionally include other components.

Figure 3:
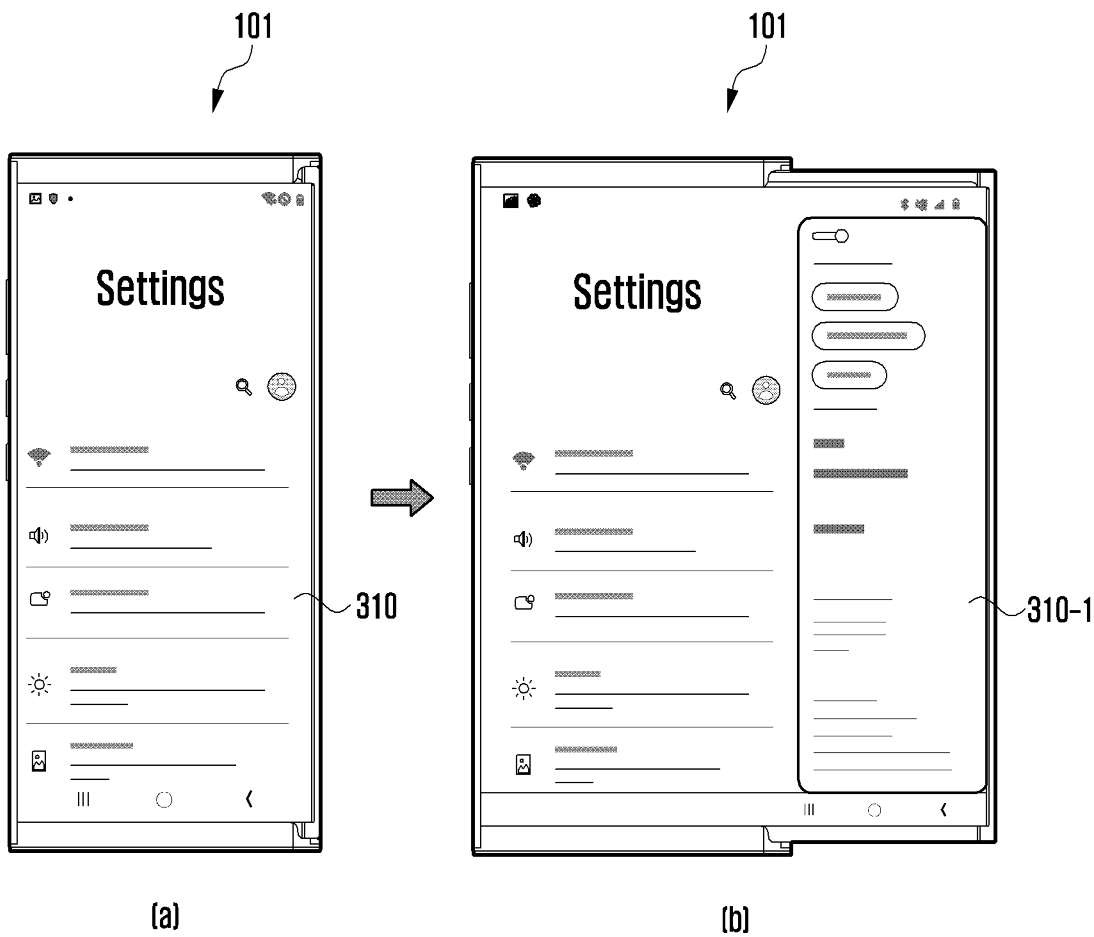
FIG. 3 illustrates a screen configuration according to a change in the size of a display area according to certain embodiments.

FIG. 3 illustrates a screen configuration according to a change in the size of a display area according to certain embodiments.

Referring to FIG. 3, in an electronic device (e.g., the electronic device 101 of FIG. 1) according to an embodiment, the size of an area (or a display area) exposed to the outside of a display may be changed according to a state (e.g., a slide-in state or a slide-out state) of the electronic device 101.

In FIG. 3, case (a) the electronic device is in a slide-in state. In the slide-in state, the display size is smaller. The screen size can be increased by sliding a second housing outward. In FIG. 3, case (b), the electronic device is in a slide-out state. It is noted that the aspect ratio for the slide-in states is different from the aspect ratio for the slide-out state. Moreover, the screen may display additional content 310-1 in the slide-out state than the content that is displayed in the slide-in state, because of the larger screen size.

For example, when the electronic device 101 is in a slide-in state as shown in case (a) of FIG. 3, the electronic device may display visual information through a display including a display area having a first size. In the slide-in state, the electronic device may display an execution screen 310 at a first aspect ratio, The electronic device 101 can configure and display the execution screen 310 according to a first layout configuration suitable for the first aspect ratio. In the slide-in state, when switching from an application execution screen to a home screen occurs, the electronic device 101 may capture (or record) the execution screen 310 currently being displayed at the first aspect ratio (e.g., 16:9 or 21:9), and include the captured execution screen in a recent task list.

As another example, when the electronic device 101 is changed to be in a slide-out state, the electronic device may display visual information through a display including a display area having a second size. In the slide-out state, the electronic device 101 may display an execution screen 310-1 at a second aspect ratio corresponding to the second size. The electronic device 101 can configure the execution screen 310-1 according to a second layout configuration suitable for the second size. In the slide-out state, when switching from an application execution screen to a home screen occurs, the electronic device 101 may capture the execution screen 310-1 currently being displayed at the second aspect ratio (e.g., 4:3), and include the captured execution screen in a recent task list.

Hereinafter, certain embodiments will be described with respect to examples of operating an electronic device, where a recent task list function of applications currently being serviced provides execution screens 310/310-1 based on the current display area size, regardless of the display area size when the execution screen 310-310-1 was captured.

The electronic device 101 according to certain embodiments may include a first housing (e.g., the first housing 210 of FIG. 2), a second housing (e.g., the second housing 220 of FIG. 2). The second housing is slidably coupled with respect to the first housing. The electronic device includes a display (e.g., the display module 160 of FIG. 1 and the display 230 of FIG. 2) in which an viewable area to the outside of the electronic device is changed from a first size to a second size according to a sliding distance of the second housing with respect to the first housing. A processor (e.g., the processor 120 of FIG. 1), while the viewable area of the display has the first size, receives a first input. The first input requests a recent task list of at least one application being serviced. In response, the processor causes the display to display the recent task list. The recent task list includes at least one execution screen image corresponding to the at least one application being serviced with a first aspect ratio for the first size. When the viewable area has the second size, the processor causes display of at least one execution screen image corresponding to the at least one application having a second aspect ratio for the second size.

The processor 120 according to certain embodiments may be further configured to, while the viewable area has the first size, at a time point when the at least one application being serviced is switched from the foreground to the background, record display size information and display data of an execution screen having the first size in the foreground, and capture the execution screen having the first size to store the captured execution screen as the execution screen image having the first aspect ratio.

The processor 120 according to certain embodiments may be configured to detect that the viewable area is changed from the first size to the second size, receive a second input for requesting the recent task list while the viewable area has the second size, and in response to receiving the second input, display, on the display, the recent task list in which the execution screen image having the first aspect ratio is replaced with the execution screen image having the second aspect ratio.

The processor 120 according to certain embodiments may be configured to newly allocate a buffer for each of the at least one application being serviced, based on the change of the viewable area from the first size to the second size, generate display data of an execution screen corresponding to the second aspect ratio in the allocated buffer, and store the execution screen image having the second aspect ratio by using the display data generated in the allocated buffer.

The processor 120 according to certain embodiments may store the execution screen image having the second aspect ratio independently of the execution screen image having the first aspect ratio.

The processor 120 according to certain embodiments may be configured to receive a second input for requesting display of the recent task list while the viewable area has the second size, and in response to the second input, include the execution screen image having the first aspect ratio and the execution screen image having the second aspect ratio in the recent task list and display the same.

The processor 120 according to certain embodiments may be configured to receive a third input for selecting the execution screen image having the first aspect ratio from the recent task list, control the viewable area to be changed from the second size to the first size, in response to the third input, and perform switching to the foreground and display, in the area changed to the first size, an application corresponding to the selected execution screen image having the first aspect ratio.

The processor 120 according to certain embodiments may be configured to receive a third input for selecting one execution screen image included in the recent task list, identify display size information corresponding to the selected execution screen image, when the size of the area exposed to the outside of the electronic device is different from the display size information of the selected execution screen image, automatically change the area of the display, in response to the third input, and perform switching to the foreground and display, in the changed area, an application corresponding to the selected execution screen image.

The recent task list may include at least one of a thumbnail image captured at a time point when the at least one application being serviced is switched from the foreground to the background, and an execution window capable of receiving a touch input, and the execution window may include the thumbnail image.

The processor 120 according to certain embodiments may be configured to, while the viewable area has the second size, include an execution window including a multi-window execution screen image in the recent task list and display the same, change the viewable area from the second size to the first size, in response to a third input for selecting a divided area of the multi-window execution screen image, perform switching to the foreground and display, in the changed area having the first size, a first application being displayed in the selected divided area, and in response to a fourth input for simultaneously selecting two divided areas of the multi-window execution screen image, perform switching to the foreground and display, in the area having the second size, applications being serviced in multiple windows.

The processor 120 according to certain embodiments may be configured to, in a case of displaying the recent task list including the execution screen image having the second aspect ratio on the display, the viewable area of which has the first size, display the execution screen image having the second aspect ratio in an execution window having the first aspect ratio, and include a scroll item in the execution window having the first aspect ratio.

The processor 120 according to certain embodiments may be configured to identify a configuration option related to the recent task list, when the configuration option is a window change function, replace the execution screen image having the first aspect ratio with the execution screen image having the second aspect ratio in response to the change from the display having the first size to the display having the second size, when the configuration option is a resizing display function, configure, in the recent task list, a recent task list including the execution screen image having the first aspect ratio and the execution screen image having the second aspect ratio, and when an aspect ratio of an execution screen image selected from the recent task list is different from the size of the display currently being displayed, change the display size according to the aspect ratio of the selected execution screen.

Figure 4:
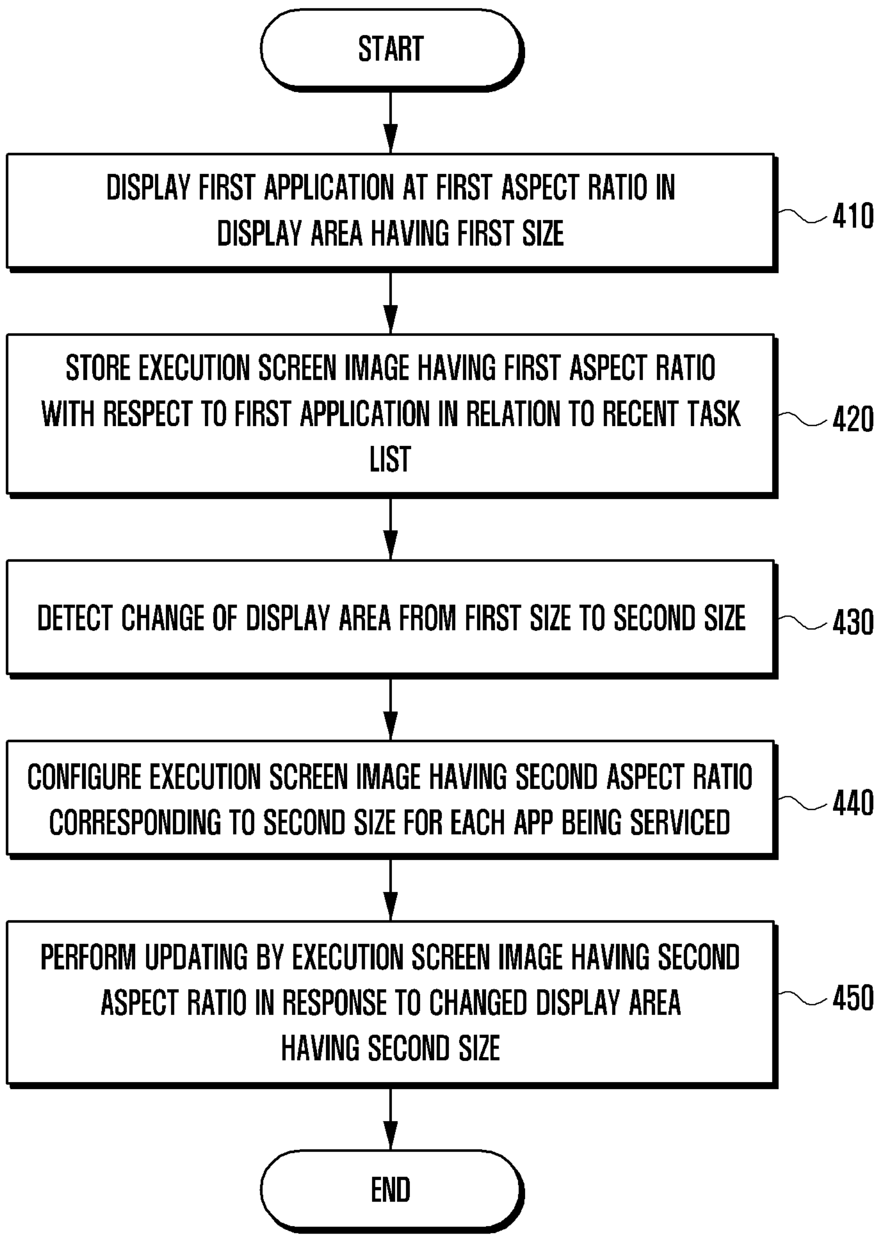
FIG. 4 illustrates a method for controlling display of an application execution screen in a flexible electronic device according to an embodiment.

FIG. 4 illustrates a method for controlling display of an application execution screen in a flexible electronic device according to an embodiment.

Referring to FIG. 4, according to an embodiment, in operation 410, a processor (e.g., the processor 120 of FIG. 1) of the electronic device 101 may display an execution screen of a first application in the foreground at a first aspect ratio while an area (or a display area where visual information is to be displayed) exposed to the outside of a display has a first size. The foreground may refer to a screen exposed on a front surface of the display or a screen exposed through a top layer.

In some cases, the electronic device 101 may be in a state in which multiple applications are being serviced in the background by multi-tasking.

In operation 420, the processor 120 may store an execution screen image at a first aspect ratio with respect to the first application in relation to a recent task list.

For example, the processor 120 may switch the first application to the background in response to a screen switching interaction (e.g., a touch gesture for switching from an application execution screen to a home screen) of a user. At a time point when the first application is switched from the foreground to the background, the processor 120 may stop an operation of the first application and store (or capture) the last execution screen (or display data included in the execution screen) as an execution screen image type. The processor 120 may resize the stored execution screen image and include the resized image in the recent task list.

The execution screen image may be stored (or captured) at an aspect ratio corresponding to the size of an area exposed to the outside of the current display.

The recent task list (or a recent execution screen list, a recent card list, a recently executed app list) is a function of listing and displaying execution screens of applications currently being serviced in the electronic device 101 on the display, and images of the execution screens may be listed in a card form, and may be listed in a horizontal or vertical direction depending on implementation.

The execution screen images may be a thumbnail image (or a preview image, a card image, a still image, or a window image) based on display data captured or stored at a time point of switching from the foreground to the background, and may include an execution window in some cases. The execution window may be an area allocated a window capable of receiving a touch input, separate from an area in which a captured image is displayed.

In operation 430, the processor 120 may detect a change of the area exposed to the outside of the display from the first size to a second size.

According to an embodiment, the processor 120 may detect the degree of reduction/expansion of the display (or a housing which receives the display), based on at least one sensor (e.g., a distance sensor or an expansion detection sensor) included in the electronic device 101. The electronic device 101 may identify a state change of a display structure, based on sensor information, and display visual information (e.g., a content and an execution screen) corresponding to the changed size of the area exposed to the outside of the display.

In operation 440, while the area exposed to the outside of the display has the second size, the processor 120 may configure an execution screen image having a second aspect ratio corresponding to the second size for each application being serviced in relation to the recent task list.

For example, when a new application (or a second application) is executed according to a user request while the area exposed to the outside of the display has the second size, the processor 120 may display an execution screen having the second size on the display. At a time point when the new application is switched from the foreground to the background, the processor 120 may stop an operation of the new application and store (or capture) the last execution screen (or display data included in the execution screen) having the second size as an execution screen image type. The processor 120 may resize the execution screen image stored in the second size and include the resized image in the recent task list.

As another example, while the area exposed to the outside of the display has the second size, since the first application is being serviced in the background, the processor 120 may configure the execution screen image stored at the first aspect ratio corresponding to the first size to the second aspect ratio corresponding to the second size.

According to an embodiment, the processor 120 may newly allocate, to a window manager, a graphic buffer for updating the recent task list for each application being serviced, and instruct update of the recent task list together with size information of the display area. The window manager may generate (or configure or record) display data having the second aspect ratio suitable for the second size in the graphic buffer newly allocated for each application, based on execution screen data having the first aspect ratio, and generate the execution screen image having the second aspect ratio, based on display data to be displayed as an execution screen having the second aspect ratio. According to an embodiment, display data of screen configuration added when an execution screen image is expanded from the first aspect ratio to the second aspect ratio or the screen configuration may be defined in advance.

In operation 450, the processor 120 may update the recent task list by the execution screen image having the second aspect ratio, based on the change of the area exposed to the outside of the display from the first size to the second size.

According to an embodiment, the processor 120 may reflect the change of the size of the area exposed to the outside of the display to replace execution screen images having the first size with execution screen images having the second size, so as to update the recent task list.

According to another embodiment, the processor 120 may reflect the change of the size of the area exposed to the outside of the display and update the recent task list so as to include an execution screen image having the second size independently of an execution screen image having the first size.

Figure 5:
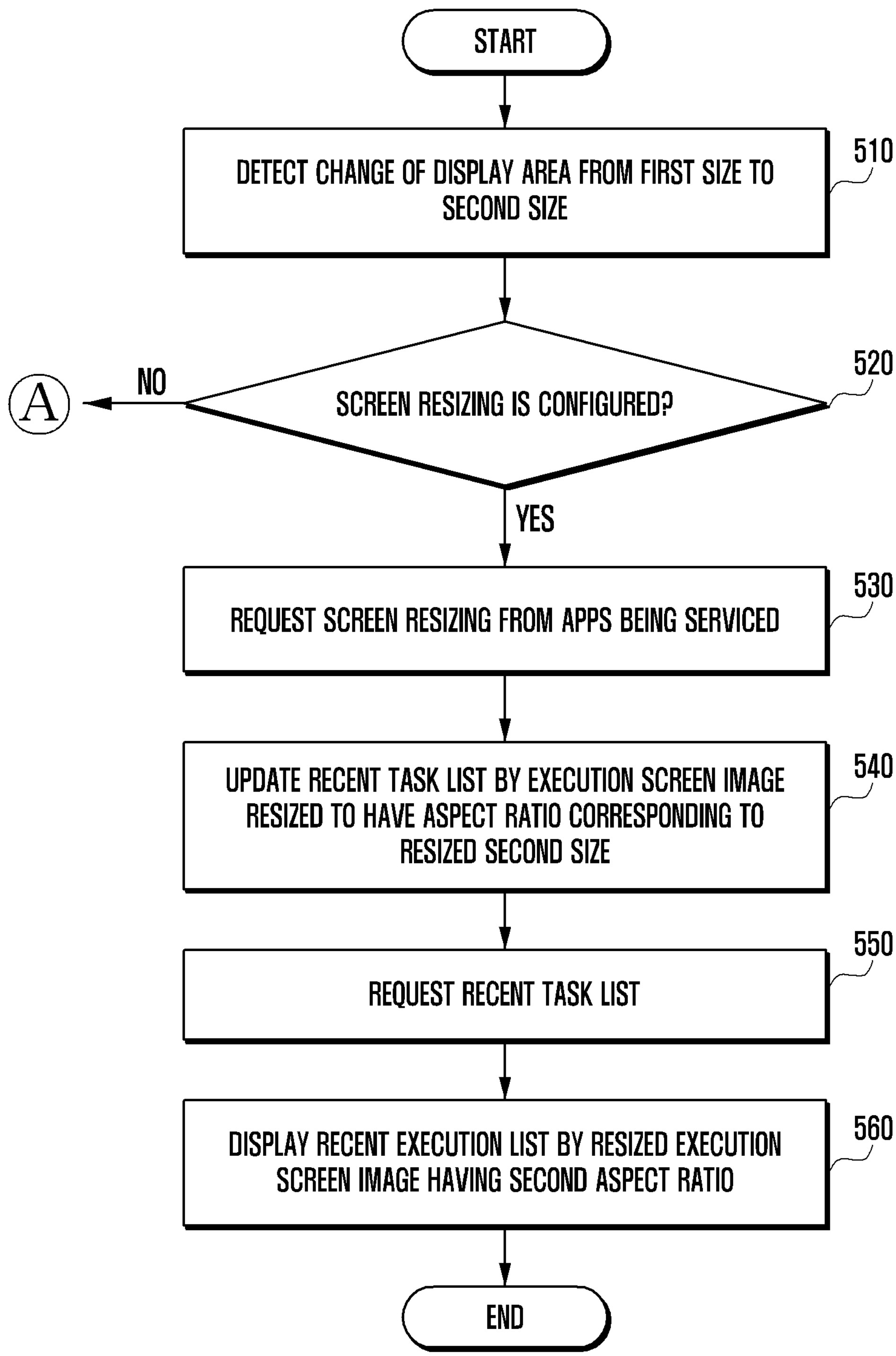
FIG. 5 illustrates a method for controlling display of an application execution screen in a flexible electronic device according to an embodiment.

FIG. 5 illustrates a method for controlling display of an application execution screen in a flexible electronic device according to an embodiment.

Referring to FIG. 5, according to an embodiment, in operation 510, a processor (e.g., the processor 120 of FIG. 1) of an electronic device (e.g., the electronic device 101 of FIG. 1) may detect that a display area (or an area exposed to the outside of a display) displaying visual information is changed from a first size to a second size on the display.

For example, the processor 120 may detect switching of the display from a slide-in state to a slide-out state or detect switching of the display from the slide-out state to the slide-in state. When the first size is a display size in the slide-in state, the second size may refer to a display size in the slide-out state, and conversely, when the first size is a display size in the slide-out state, the second size may refer to a display size in the slide-in state.

In operation 520, the processor 120 may determine whether an execution screen resizing function is configured.

According to an embodiment, the electronic device 101 may provide a list mode configuration user interface (UI) which supports display mode configuration/cancellation of a recent task list function. For example, although not shown in the drawings, the list configuration UI may support a function of selecting at least some of a resizing display mode (function), a double display mode (function), a window change mode (function), or a last execution environment priority mode (function). The resizing display mode may be a mode of resizing and displaying execution screen images at an aspect ratio corresponding to the size of an area exposed to the outside of the current display. The double display mode may be a mode in which an execution screen image having a first aspect ratio and an execution screen image having a second aspect ratio are doubly displayed. The window change mode may be a mode in which a screen image is displayed at a size corresponding to the area exposed to the outside of the display and information included in an execution screen is assigned to an execution window to additionally provide the information. The last execution environment priority mode may be a mode in which the area exposed to the outside of the display is changed at an aspect ratio at a time point of generating an execution screen image.

According to some embodiments, the electronic device 101 may support the resizing display mode, the double display mode, and the last execution environment priority mode. According to some embodiments, the electronic device 101 may support only the window change mode or support only the last execution environment priority mode.

For example, when the resizing display mode is selected (or checked) in the list mode configuration user interface (UI), the processor 120 may determine that the execution screen resizing function is configured.

In some cases, although not shown in the drawings, the electronic device 101 may identify whether an execution screen image having an aspect ratio having a size (e.g., the first size) different from a size (e.g., the second size) of the area exposed to the outside of the current display exists among execution screen images included in a recent task list, in response to the size change of the area exposed to the outside of the display, and proceed to operation 520 when the execution screen image having an aspect ratio having a different size (e.g., the first size) exists. The electronic device 101 may compare aspect ratio information of generated execution screen images related to the recent task list, so as to identify whether the execution screen image having an aspect ratio having a size (e.g., the first size) different from the current display size (e.g., the second size) exists.

According to some embodiments, operation 520 may be omitted, and the electronic device may proceed from operation 510 to operation 530.

In operation 530, when the execution screen resizing function is configured, the processor 120 may request screen resizing from applications being serviced in the background.

The processor 120 may instruct a window manager to update the recent task list together with size information of the area exposed to the outside of the current display. The window manager may generate (or configure or record) display data having the second aspect ratio suitable for the second size, based on execution screen data having the first aspect ratio recorded in a graphic buffer for each application being executed in the background, and generate an execution screen image having the second aspect ratio corresponding to the second size.

In operation 530, the processor 120 may proceed to operation A when the execution screen resizing function is not configured.

In operation 540, the processor 120 may update the recent task list by the execution screen images resized to have the aspect ratio corresponding to the second size.

In operation 550, the processor 120 may receive an interaction input for requesting display of the recent task list. In operation 560, the processor 120 may display the recent task list by the execution screen images resized to have the second aspect ratio.

Figure 6A:
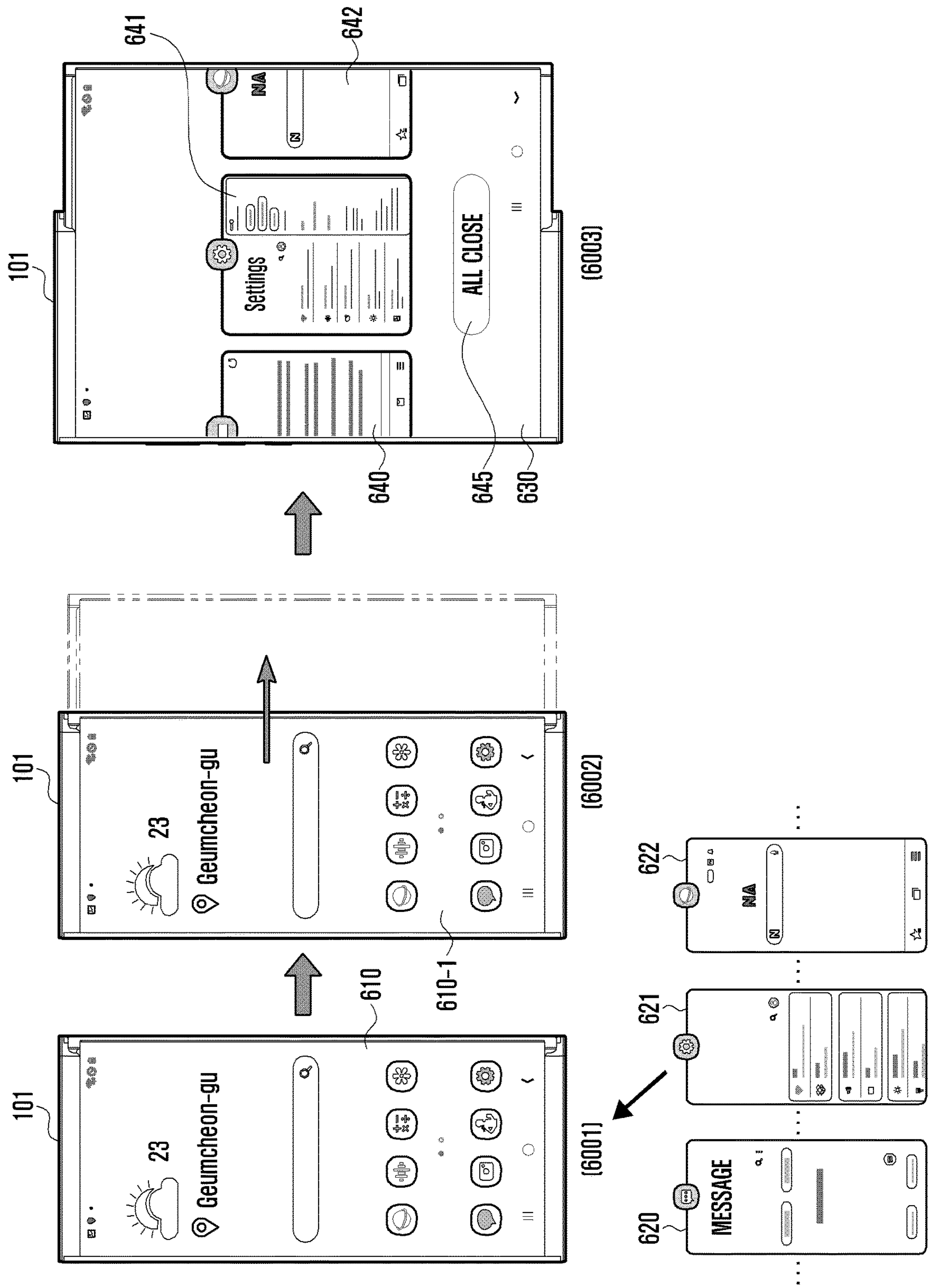
FIGS. 6A and 6B illustrate screens for controlling display of an application execution screen in a flexible electronic device according to an embodiment.
Figure 6B:
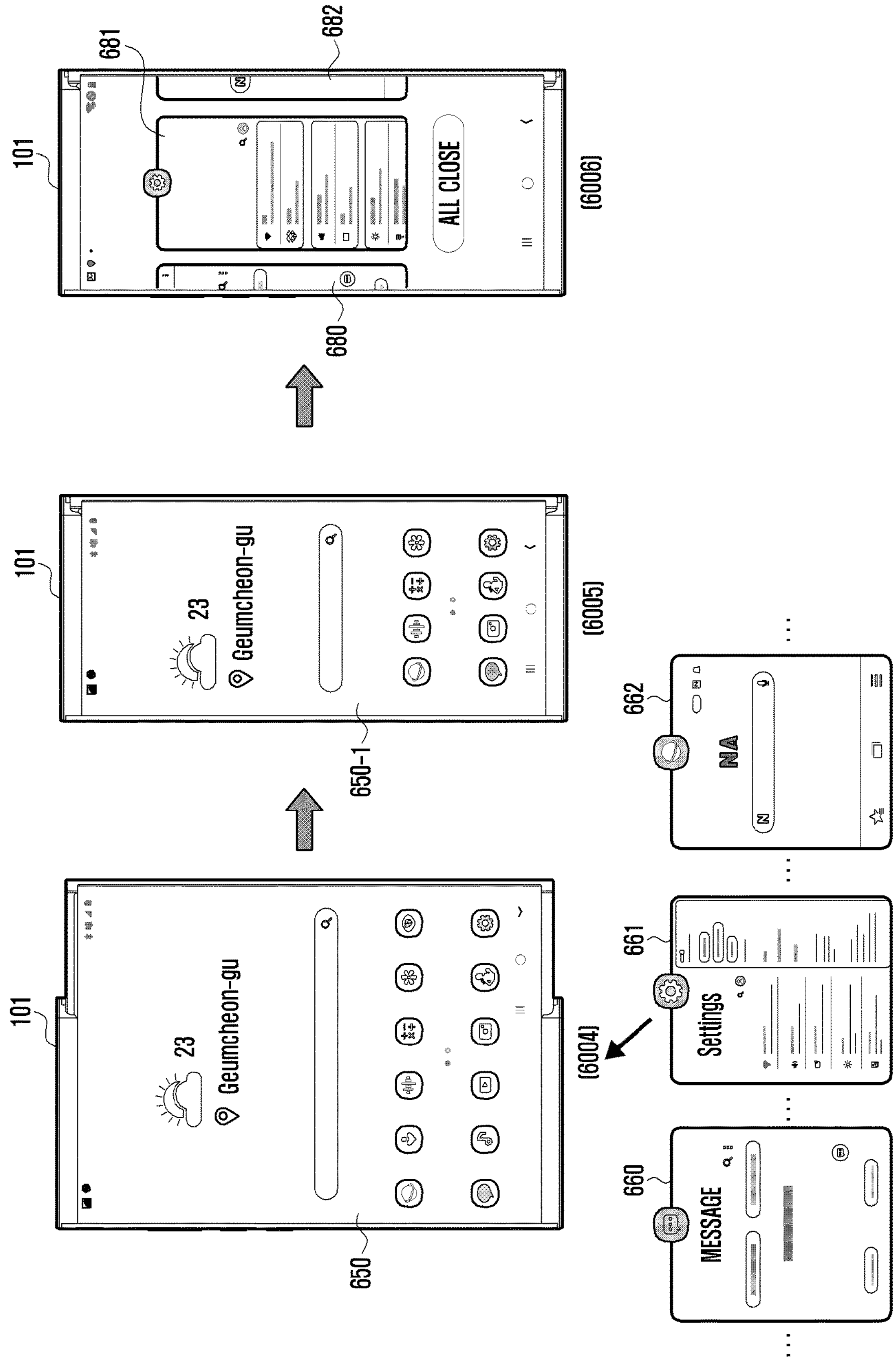

FIGS. 6A and 6B illustrate screens for controlling display of an application execution screen in a flexible electronic device according to an embodiment.

Referring to FIGS. 6A and 6B, according to an embodiment, the electronic device 101 may operate in a slide-in state as shown in <6001>. In the slide-in state of the electronic device 101, a display area (or an area exposed to the outside) of a display may have a reduced size (e.g., a first size), and display a home screen 610 having an aspect ratio (e.g., a first aspect ratio) for the reduced size. For example, the home screen 610 having the reduced size may be displayed based on a first layout configuration corresponding to the first aspect ratio.

The electronic device 101 may allow the user to engage in multi-tasking. During multi-tasking, the user can use more than one application at one time. Typically, applications that are not the most recently used are executed or serviced in the background. The electronic device 101 may switch an application (or task) being serviced to the background, by requesting the home screen while the electronic device works on the application in the slide-in state. The electronic device 101 may generate a recent task list. The task list may include an executing screen with the first aspect ratio that was being displayed at the moment that the application was switched to the background. For example, the electronic device 101 may be in a state in which execution screen images 620, 621, and 622 having the first aspect ratio are recorded (or stored).

As shown in <6002>, the electronic device 101 may detect a change from the slide-in state to a slide-out state. The change may be based on a user request or another event request. For example, in an embodiment, the user may provide an input that causes a motor to slide the second housing way. Alternatively, the user may manually slide the second housing from the first housing. In the slide-out state, the display area of the display may have an expanded size (e.g., a second size). In response, the electronic device 101 may change the home screen to a home screen 610-1 having an aspect ratio (e.g., a second aspect ratio) corresponding to the expanded size. For example, the home screen 610-1 having the expanded size may be displayed based on a second layout configuration corresponding to the second aspect ratio.

The user can ask for a recent task list. For example, the user can request the recent list. The recent task list is a set of execution screens 641, 642 for each application that is currently executing in the background. In some embodiments, the recent task list can also include an execution screen for an application that is a foreground application. Alternatively, the request for the recent list can cause the foregoing application to become a background application.

In certain embodiments, the user can request the recent list by slowly dragging their finger from the bottom of the screen, upwards. As shown in <6003>, the electronic device 101 may display a recent task list 630 by execution screen images 640, 641, and 642. The execution screen images 640, 641, 642 are proportionally smaller than the size of the display area, but have an aspect ratio based on the aspect ratio of the display area. Accordingly, execution screens 640, 641, and 642 have the second aspect ratio for the expanded size, in response to a user input for requesting display of the recent task list.

It is noted that the aspect ratio of the execution screen images 640, 641, 642 for the reduced size and the aspect ratio of the execution screen images 640, 641, 642 for the expanded size may be, but do not have to be substantially the same as the aspect ratio of the reduced size of the display area and the aspect ratio of the expanded size. For example, the aspect ratio for the execution screen images 640, 641, 642 for the reduced size can have a greater height to width dimensions as compared to the aspect ratio of the execution screen images for the expanded size.

The electronic device 101 may configure display data corresponding to the second aspect ratio. The display data can be configured to the second aspect ratio using display data of execution screen(s) having the first aspect ratio. The display data of execution screen(s) is recorded for each application being serviced. In response to the change from the slide-in state to the slide-out state, the electronic device 101 can generate execution screen image(s) having the second aspect ratio from the execution screen(s) to update the recent task list 630. For example, an execution screen image (e.g., 621) having the first size recorded in the slide-in state is stored in the first layout configuration corresponding to the first aspect ratio. When the display size is changed, the electronic device 101 may generate, in a graphic buffer, an execution screen image (e.g., 641) in the second layout configuration (different from the first layout configuration). The electronic device 101 can update the execution screen image in the recent task list 630.

For example, the electronic device 101 may replace the execution screen images 620, 621, and 622 having the first aspect ratio with the execution screen images 640, 641, and 642 having the second aspect ratio, and then display the replaced execution screen images in the recent task list 630.

The recent task list 630 may be displayed so that the execution screen images 640, 641, and 642 of applications being serviced in the electronic device 101 are listed in a card form (each execution screen laid out separately), but is not limited thereto and may be displayed in a stack form, or hybrid form (where each execution screen partially overlaps another execution screen, but can be at least partially discernable). The electronic device 101 may switch a selected application to the foreground, in response to receiving a first touch gesture (e.g. a touch or tap) designated for one execution screen image in the recent task list 630. For example, the user can scroll the execution screens 641, 642 by making a drag gesture until the intended execution screen is displayed and then tapping it. The electronic device 101 may end a service of the selected application, in response to receiving a second touch gesture (e.g., dragging or flicking in one direction after a long touch) designated for one execution screen image in the recent task list 630.

The recent task list 630 may include an item of a close-all button 645. The electronic device 101 may collectively end services of all applications being serviced in relation to the recent task list 630, in response to a touch gesture of selecting the item of the close-all button 645.

The electronic device 101 may operate in the slide-out state as shown in <6004> of FIG. 6B. In the slide-out state of the electronic device 101, the display area of the display may have an expanded size (e.g., the second size), and display a home screen 650. The home screen 650 may have an aspect ratio (e.g., the second aspect ratio) for the expanded size. For example, the home screen 650 having the expanded size may be displayed based on the second layout configuration for the second aspect ratio.

The electronic device 101 may switch an application (or task) being serviced to the background, in response to a user input, while the electronic device works on the application in the slide-out state. In the case of the slide-out state, the electronic device 101 may generate a recent task list having the second aspect ratio. For example, the electronic device 101 may be in a state in which execution screen images 660, 661, and 662 having the second aspect ratio are recorded (or stored). Alternatively, as shown in FIG. 6A, the electronic device may be in a state in which the execution screen images having the first aspect ratio are updated to the execution screen images having the second aspect ratio.

As shown in <6005>, the electronic device 101 may detect a change from the slide-out state to the slide-in state. The change may be based on a user request or another event request. In the slide-in state, the display area of the display may have a reduced size (e.g., the first size). The electronic device 101 may display a home screen 650-1 at the first aspect ratio.

As shown in <6006>, the electronic device 101 may display a recent task list 670 by execution screen images 680, 681, and 682 having the first aspect ratio, in response to a user input for requesting display of the recent task list.

The electronic device 101 may configure display data for the recent task list that corresponds to the first aspect ratio in response to the change from the slide-out state to the slide-in state. The display data corresponding to the first aspect ratio can be generated based on display data of an execution screen having the second aspect ratio that was recorded for each application for the recent task list. In response to the change from the slide-out state to the slide-in state, the electronic device 101 can update the generated execution screen image(s) in the recent task list 670. For example, in <6004>, the image 661 may be displayed in the second layout configuration according to the second aspect ratio, and in <6006>, the image 681 may be displayed in the first layout configuration according to the first aspect ratio.

The electronic device 101 may replace the execution screen images 640, 641, and 642 having the second aspect ratio with the execution screen images 640, 641, and 642 having the first aspect ratio, and then display the replaced execution screen images in the recent task list 670.

Figure 7:
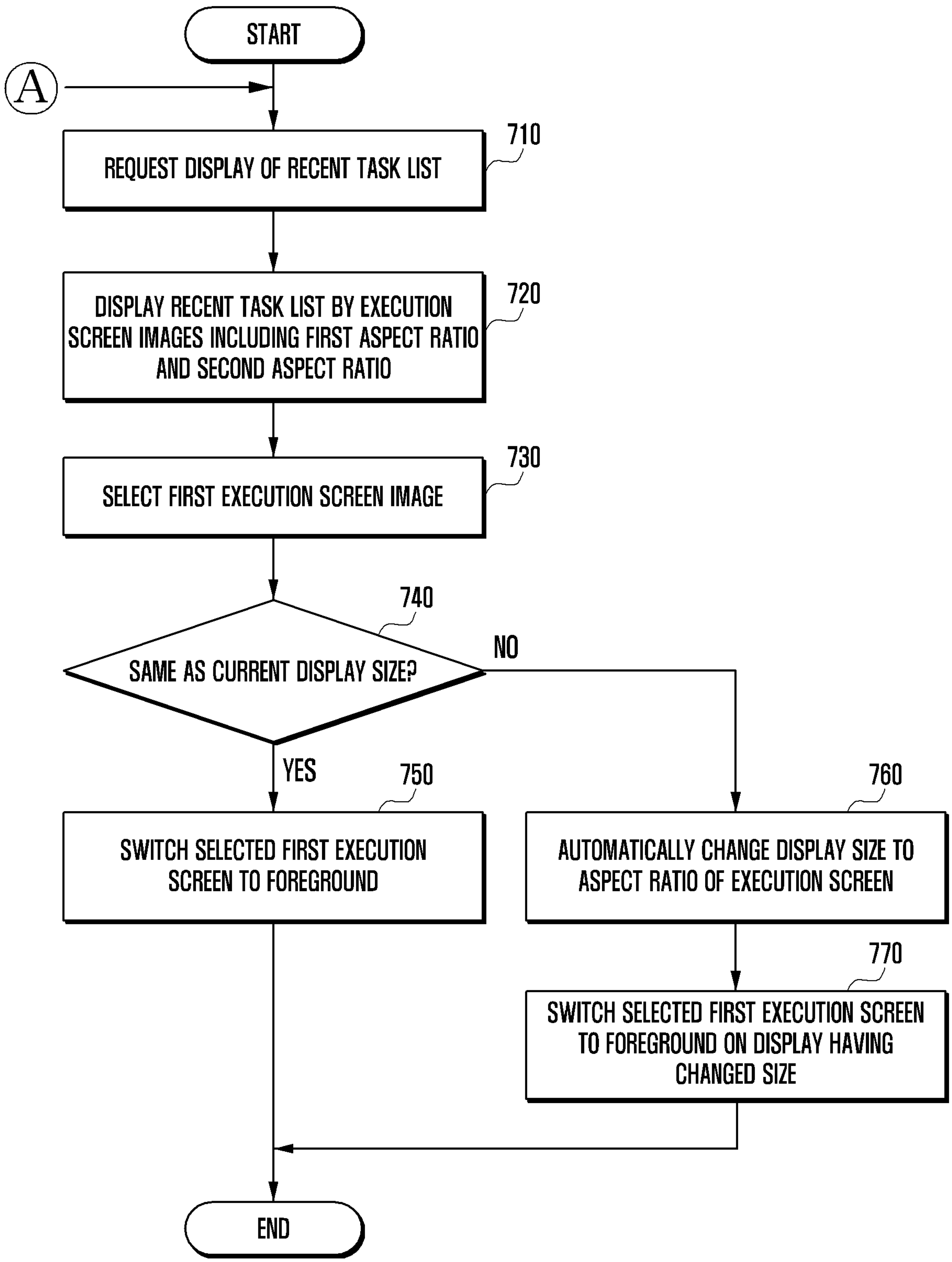
FIG. 7 illustrates a method for controlling display of an application execution screen in a flexible electronic device according to an embodiment.

FIG. 7 illustrates a method for controlling display of an application execution screen in a flexible electronic device according to an embodiment.

Referring to FIG. 7, according to an embodiment, in operation 710, a processor (e.g., the processor 120 of FIG. 1) of an electronic device (e.g., the electronic device 101 of FIG. 1) may receive a user input for requesting a recent task list. For example, the processor may receive an input for selecting a recent task list item or receive a touch gesture designated to call the recent task list.

According to some embodiments, the electronic device 101 may perform operation 710 of FIG. 7 when an execution screen resizing function is not configured in operation A of FIG. 5. In some cases, a mode in which the execution screen resizing function is not configured may be a state in which one of a double display mode and a display display mode is configured.

In operation 720, the processor 120 may display a recent task list configured by execution screen images having a first aspect ratio and a second aspect ratio.

Since the electronic device 101 generates execution screen images at a time point when an application being serviced is switched to the background, in a slide-in state, the execution screen images having the first aspect ratio may be generated while an area (or a display area) exposed to the outside of a display has a first size, and in a slide-out state, the execution screen images having the second aspect ratio may be generated while the area (or the display area) exposed to the outside of the display has a second size. The recent task list may be displayed so that the execution screen images having the first aspect ratio and the execution screen images having the second aspect ratio are mixed.

In operation 730, the processor 120 may receive an input for selecting (e.g., a touch or tap) a first execution screen image from the recent task list.

In operation 740, the processor 120 may determine whether an aspect ratio of the selected first execution screen image is the same as the current display size (or the size of the display area).

In operation 750, when the aspect ratio of the first execution screen image and the current display size are the same, the processor 120 may perform switching to the foreground to display the selected first execution screen thereon.

In operation 760, when the aspect ratio of the first execution screen image is different from the current display size, the processor 120 may perform a control to automatically change the display size to the aspect ratio of the first execution screen.

For example, when the display size has the first aspect ratio corresponding to the first size of the aspect ratio of the selected first execution screen and the display (or the display area) currently operating has the second size, the processor 120 may automatically change the display to have the first size suitable for the first aspect ratio through a driving mechanism (e.g., a driving motor, a deceleration gear module, and/or a gear assembly).

In operation 770, the processor 120 may perform switching to the foreground to display the selected first execution screen on the changed display, in response to the change of the display size (or the size of the display area).

Figure 8:
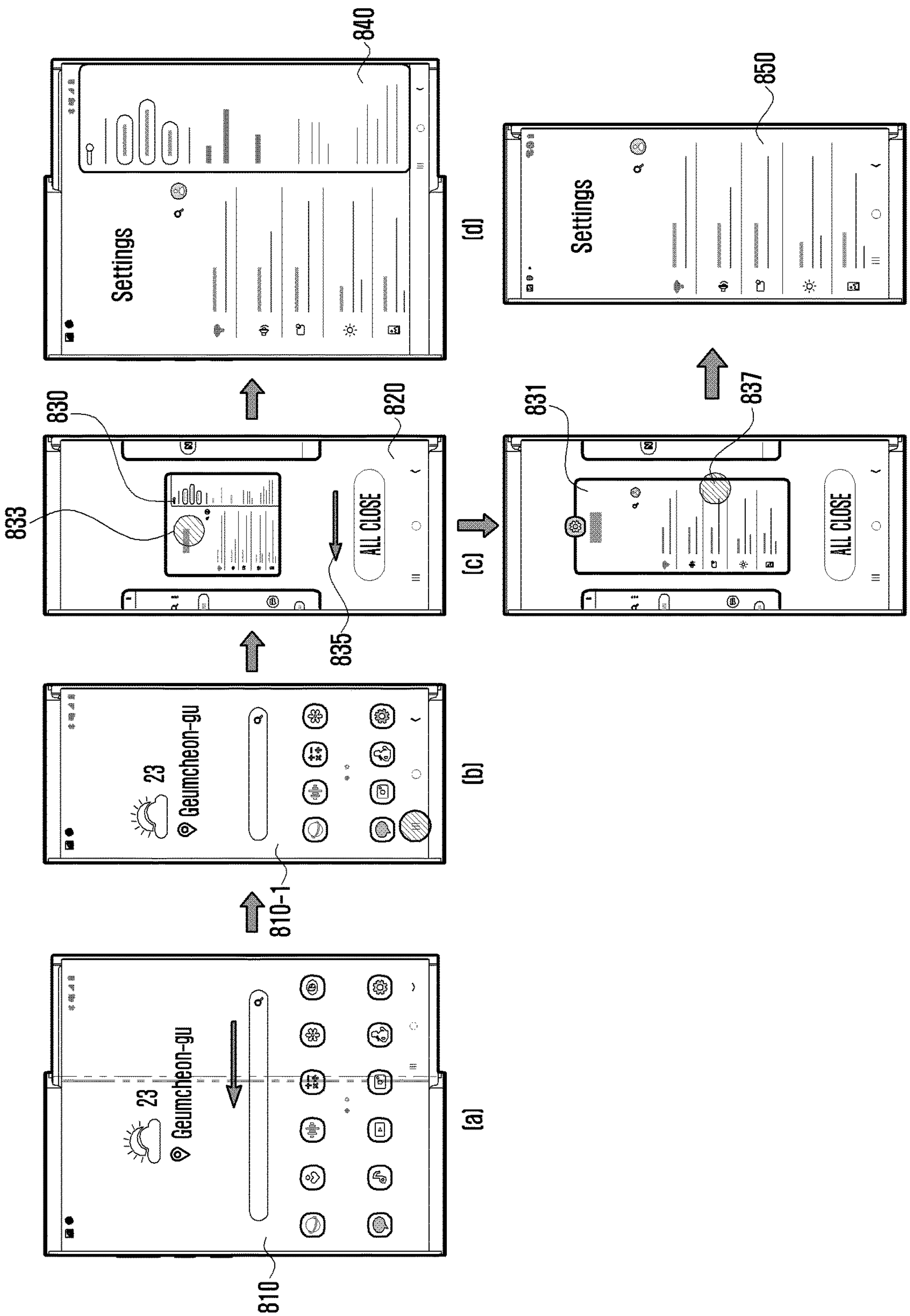
FIG. 8 illustrates screens for controlling display of an application execution screen in a flexible electronic device according to an embodiment.

FIG. 8 illustrates screens for controlling display of an application execution screen in a flexible electronic device according to an embodiment.

Referring to FIG. 8, according to an embodiment, the electronic device 101 may operate in a slide-out state as shown in case (a) of FIG. 8. As an example, the electronic device 101 may display a home screen 810 corresponding to a display (or a display area) having an expanded size. The electronic device 101 may be in a state in which a recent task list is generated by an execution screen. The execution screen can have an aspect ratio having an expanded size.

As shown in case (b) of FIG. 8, the electronic device 101 may be changed from the slide-out state to a slide-in state. As an example, the electronic device 101 may display a home screen 810-1 corresponding to the display (or the display area) having a reduced size, in response to the change to the slide-in state.

As shown in case (c) of FIG. 8, the electronic device 101 may display a recent task list 820. The recent task list 820 includes an image having a first aspect ratio and an image having a second aspect ratio. The recent task list 820 can be displayed in response to a user input.

In the slide-in state, the electronic device 101 may receive a user input (e.g., a touch) 833 for selecting an execution screen image 830 having the second aspect ratio. In response to the user input 833, as shown in case (d) of FIG. 8, the electronic device 101 may change to the slide-out state and switch the execution screen 840 to the foreground, where the execution screen 840 has the second aspect ratio.

According to another embodiment, in the slide-in state, the electronic device 101 may receive a user input (e.g., drag) 835 for moving positions of execution screen images in the recent task list 820. The electronic device 101 may move the positions of the execution screen images according to a drag input and display the execution screen images. For example, as shown in case (e) of FIG. 8, a user may perform a drag so that an execution screen image 831 having the first aspect ratio to be switched to the foreground is positioned at the center.

The electronic device 101 may receive a user input (e.g., a touch) 837 for selecting the execution screen image 831 having the first aspect ratio, and in response to the user input, perform switching to the foreground to display a selected execution screen 850 having the first aspect ratio, as shown in case (0 of FIG. 8.

In certain embodiments, selection of an execution screen from the recent tasks list can cause the display to automatically change size. For example, the selection can cause the processor to activate a motor that drives the second housing to either slide towards or away from the first housing.

Figure 9:
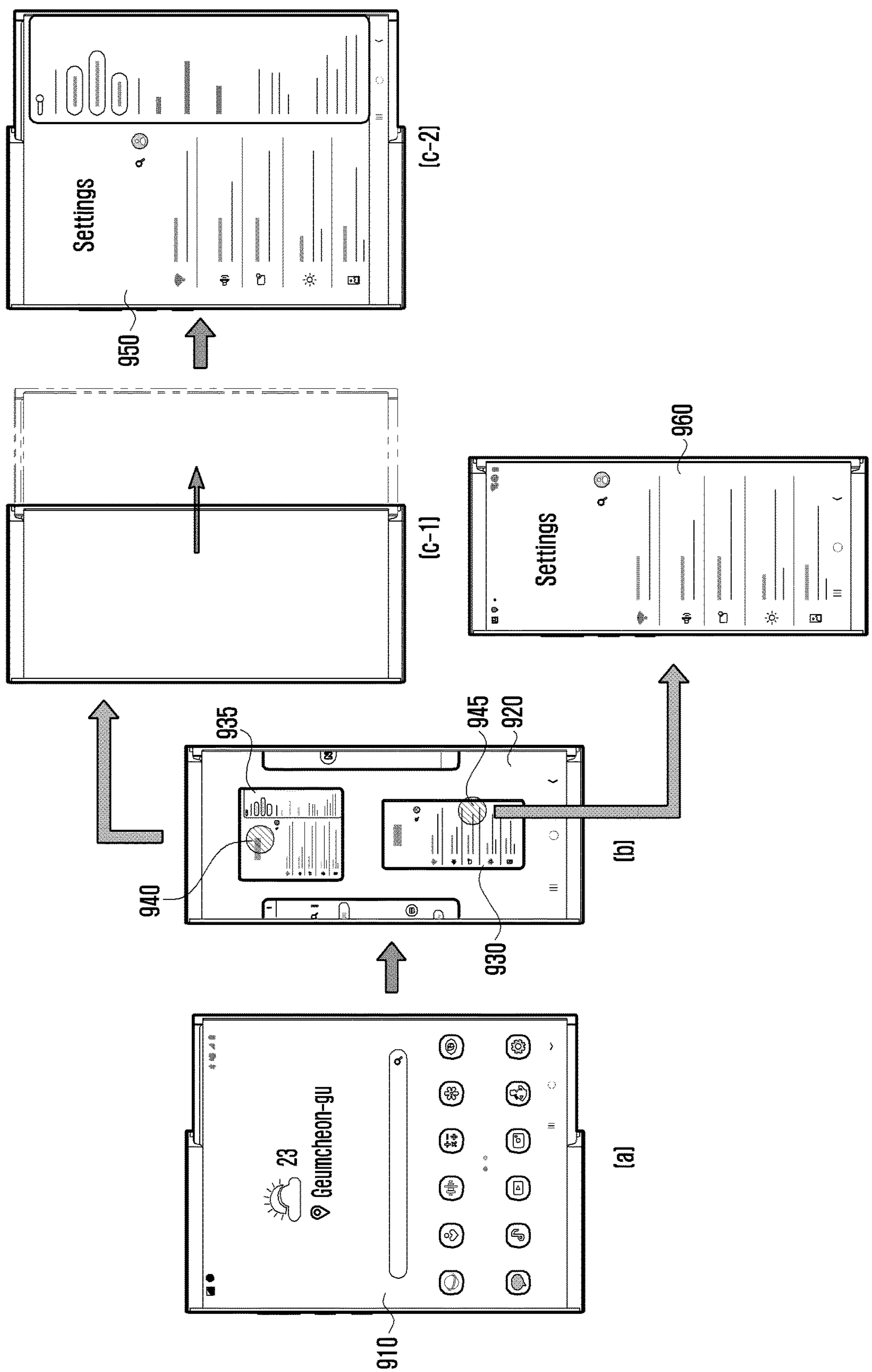
FIG. 9 illustrates screens for controlling display of an application execution screen in a flexible electronic device according to an embodiment.

FIG. 9 illustrates screens for controlling display of an application execution screen in a flexible electronic device according to an embodiment.

Referring to FIG. 9, according to an embodiment, the electronic device 101 may support a double display function in relation to a recent task list.

In the case of being changed to a display size different from a display (or display area) size at the time when an application being serviced is switched to the background, the electronic device 101 may configure an execution screen image having a first aspect ratio and an execution screen image having a second aspect ratio in relation to the recent task list, and provide both the execution screen image having the first aspect ratio and the execution screen image having the second aspect ratio to the recent task list.

The electronic device 101 may operate in a slide-out state as shown in case (a) of FIG. 9. As an example, in the slide-out state, the electronic device 101 may display a home screen 910 corresponding to a display (or a display area) having an expanded size and then be changed to be in a slide-in state.

After the electronic device is changed to be in the slide-in state, the electronic device 101 may display a recent task list 920, as shown in case (b) of FIG. 9, in response to an input for requesting display of the recent task list.

For example, in response to the change from the slide-out state to the slide-in state, when execution screen images having a size different from the current display (or display area) size exist, the electronic device 101 may generate execution screen images having an aspect ratio corresponding to the current display (or display area) size.

The electronic device 101 may include and provide both an execution screen image 930 having the first aspect ratio and an execution screen image 935 having the second aspect ratio to the recent task list 920.

In the slide-in state, the electronic device 101 may receive a user input (e.g., a touch) 940 for selecting the execution screen image 935 having the second aspect ratio. The electronic device 101 may be changed to be in the slide-out state as shown in case (c-1) of FIG. 9, in response to the user input 940 for selecting the execution screen image 935 having the second aspect ratio. As shown in case (c-2) of FIG. 9, the electronic device 101 may perform switching to the foreground to display a selected execution screen 950 having the second aspect ratio on the display changed to be in the slide-out state.

According to another embodiment, in the slide-in state, the electronic device 101 may receive a user input (e.g., a touch) 945 for selecting the execution screen image 930 having the first aspect ratio, and in response to the user input, perform switching to the foreground to display a selected execution screen 960 having the first aspect ratio to, as shown in case (d) of FIG. 8.

Figure 10:
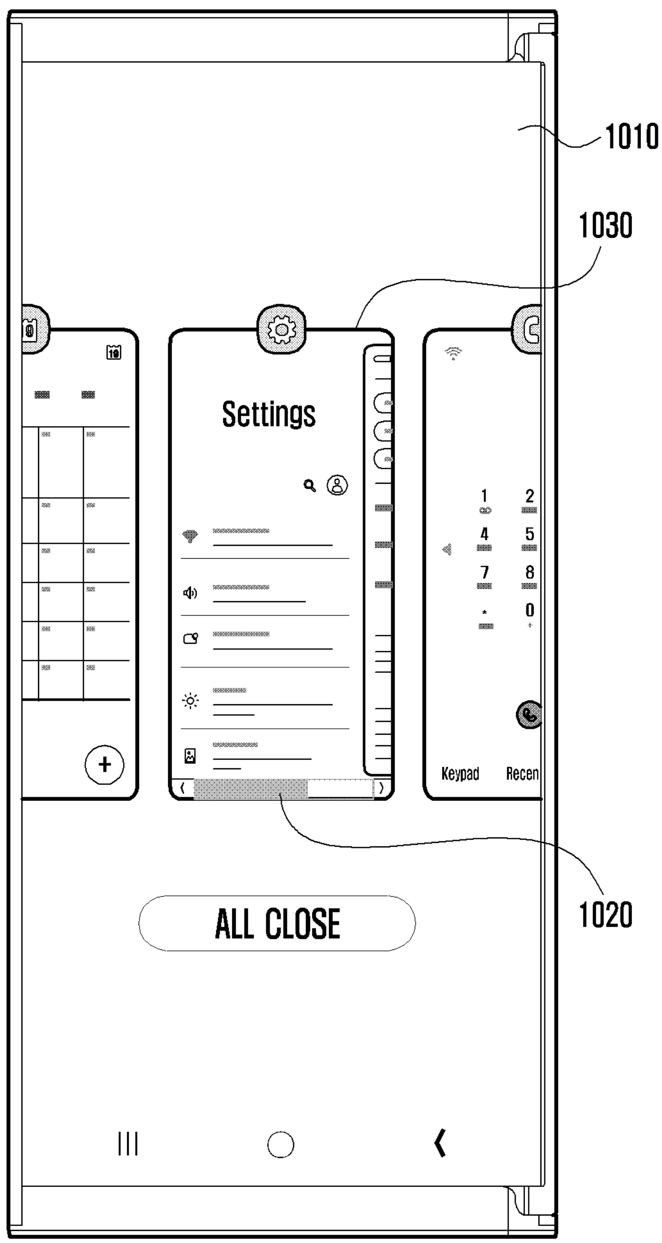
FIG. 10 illustrates a screen for controlling display of an application execution screen in a flexible electronic device according to an embodiment.

FIG. 10 illustrates a screen for controlling display of an application execution screen in a flexible electronic device according to an embodiment.

Referring to FIG. 10, according to an embodiment, the electronic device 101 may support a window change function in relation to a recent task list. The window change function may be a function which is supported when an execution screen image recorded in an expanded size is displayed on a display (or a display area) having a reduced size.

For example, in a slide-out state, the electronic device 101 may record (or store) an execution screen image having a second aspect ratio when an application being serviced is switched to the background.

The electronic device 101 may be changed from the slide-out state into a slide-in state after the execution screen image having the second aspect ratio is recorded. When the electronic device displays a recent display list 1010 after being changed to be in the slide-in state, the electronic device 101 may display at least a part of the execution screen image having the second aspect ratio recorded in the slide-out state at a first aspect ratio, and include and provide a scroll item 1020 to identify information on a hidden area.

The electronic device 101 may allocate an execution window having the first aspect ratio to an area where a first execution screen image 1030 is displayed, and include the first execution screen image and the scroll item 1020 in the execution window having the first aspect ratio and display the same.

For example, the first execution screen image 1030 is an execution screen captured in the slide-out state, and at least a part of the first execution screen image may be displayed on the execution window. A user may move the scroll item 1020 in the recent displayed list 1010 to identify information of a hidden area within the first execution screen image.

In certain embodiments, when the display is in the slide-out state, a portion of the display may be used for one application and another portion of the display may be used for another application. When the electronic device is in the slide-in state, and the execution screen is included in the recent tasks list, the user can select one of the applications from the recent tasks by touching a portion of the execution screen. In certain embodiments, selection of the execution screen can cause the electronic device to change from the slide-in state to the slide-out state.

Figure 11:
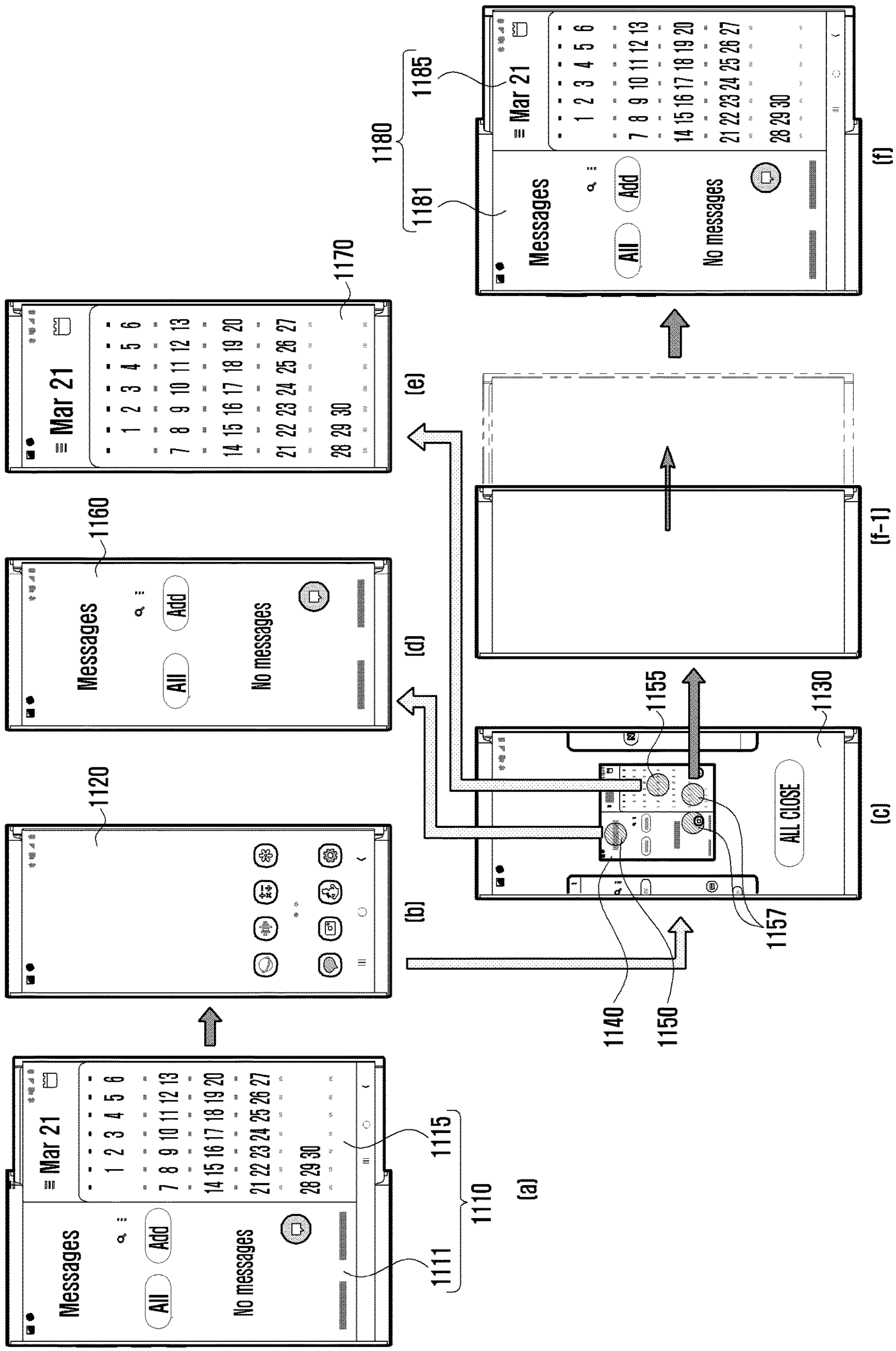
FIG. 11 illustrates a screen for controlling display of an application execution screen in a flexible electronic device according to an embodiment.

FIG. 11 illustrates a screen for controlling display of an application execution screen in a flexible electronic device according to an embodiment.

Referring to FIG. 11, according to an embodiment, the electronic device 101 may support a multi-window function in relation to a recent task list.

According to an embodiment, the electronic device 101 may display a multi-window screen 1110 in a slide-out state as shown in case (a) of FIG. 11. For example, in the multi-window screen 1110, a first application execution screen 1111 may be displayed in a first divided area, and a second application execution screen 1115 may be displayed in a second divided area.

In the slide-out state, the electronic device 101 may capture the multi-window screen 1110 and store the same in the recent task list, in response to a switching interaction to a home screen at a time point when the multi-window screen 1110 is displayed. For example, the multi-window screen 1110 may be stored as a multi-window execution screen image having a second aspect ratio having an expanded size.

As shown in case (b) of FIG. 11, the electronic device 101 may be changed from the slide-out state into a slide-in state and operate. As an example, the electronic device 101 may display a home screen 1120 corresponding to a display (or a display area) having a reduced size.

The electronic device 101 may display a recent task list 1130 in response to a user input for requesting display of the recent task list, as shown in case (c) of FIG. 11. In an example, the electronic device 101 may provide the recent task list 1130 including an image having a first aspect ratio and an image having the second aspect ratio.

For example, the electronic device 101 may include a multi-window execution screen image 1140 having the second aspect ratio in the recent task list 1130 and display the same. The electronic device 101 may allocate a separate execution window for receiving a touch input to the multi-window execution screen image, so as to support reception of a touch input generated within the multi-window execution screen image.

According to an embodiment, in the slide-in state, the electronic device 101 may receive a user input 1150 (e.g., a touch) for selecting the first divided area in the multi-window execution screen image 1140 having the second aspect ratio. In response to the user input 1150 for selecting the first divided area, as shown in case (d) of FIG. 11, the electronic device 101 may maintain the slide-in state and perform switching to the foreground to display a first application execution screen 1160 corresponding to the selected first divided area.

According to another embodiment, in the slide-in state, the electronic device 101 may receive a user input 1155 (e.g., a touch) for selecting the second divided area in the multi-window execution screen image 1140 having the second aspect ratio. In response to the user input 1155 for selecting the second divided area, as shown in case (e) of FIG. 11, the electronic device 101 may maintain the slide-in state and perform switching to the foreground to display a second application execution screen 1170 corresponding to the selected second divided area.

According to yet another embodiment, in the slide-in state, the electronic device 101 may receive a user input 1157 (e.g., a multi-touch or a simultaneous touch) for selecting the first divided area and the second divided area in the multi-window execution screen image 1140 having the second aspect ratio. In response to the user input 1157 for selecting the first divided area and the second divided area, as shown in case (f-1) of FIG. 11, the electronic device 101 may be changed to be in the slide-out state. As shown in case (f-2) of FIG. 11, after the electronic device is changed to be in the slide-out state, the electronic device 101 may display a multi-window screen 1180 including the first application execution screen 1111 and the second application execution screen 1115 in the foreground on the display (or the display area) having an expanded size.

Figure 12:
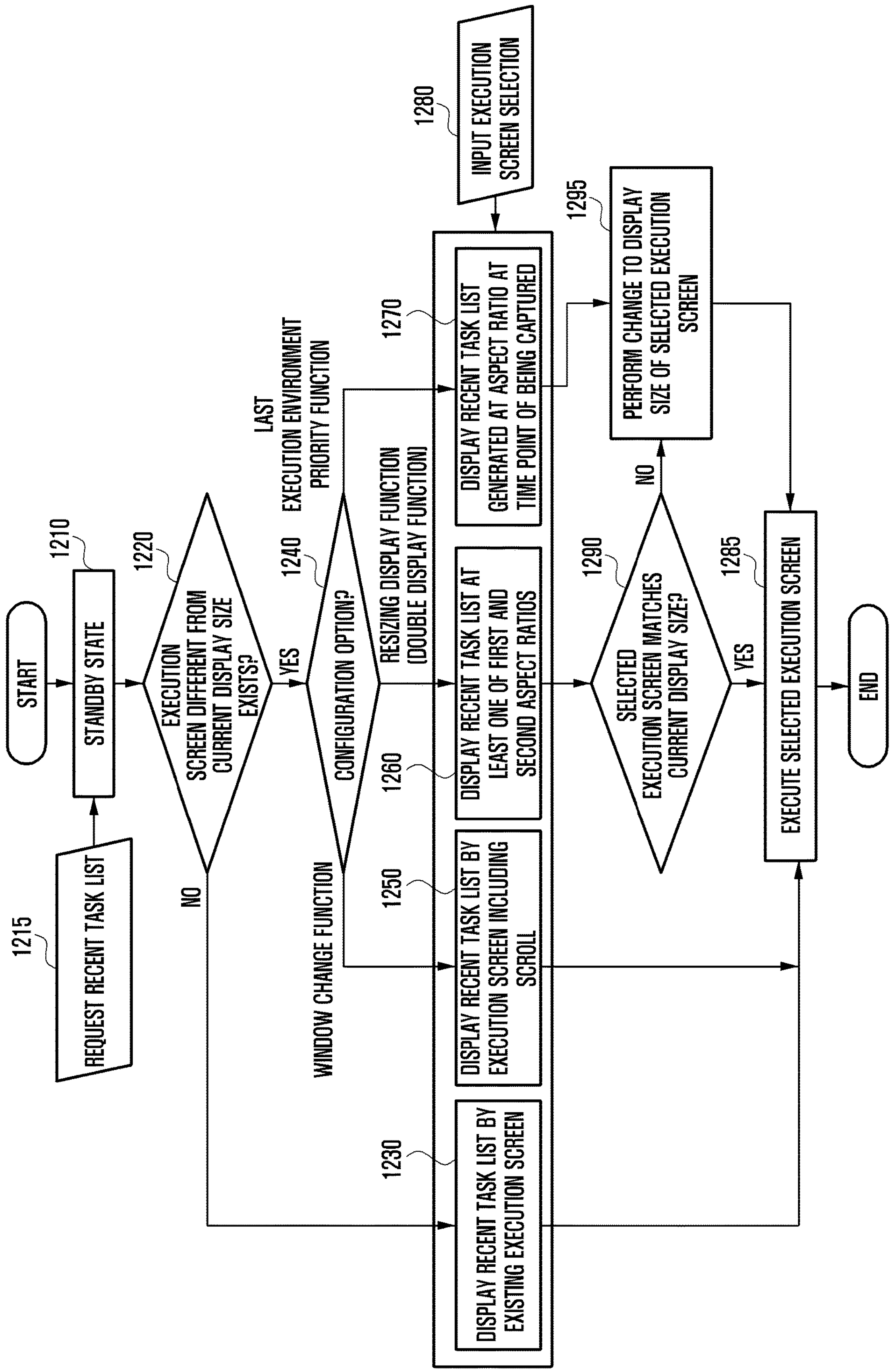
FIG. 12 illustrates a method for controlling display of an application execution screen in a flexible electronic device according to an embodiment.

FIG. 12 illustrates a method for controlling display of an application execution screen in a flexible electronic device according to an embodiment.

Referring to FIG. 12, according to an embodiment, an electronic device (e.g., the electronic device 101 of FIG. 1) may operate in a standby state in operation 1210. For example, the electronic device 101 may operate in a state in which multiple applications are being serviced, and may display a specific screen through a display according to a user request. The standby state may mean that the electronic device is operating in a slide-in state or a slide-out state.

The electronic device 101 may store (or generate) multiple execution screen images in relation to a recent task list in the standby state.

In operation 1215, a processor (e.g., the processor 120 of FIG. 1) of the electronic device 101 may receive a user input for requesting display of the recent task list. For example, the processor may receive an input for selecting a recent task list item or receive a touch gesture designated to call the recent task list.

In operation 1220, the processor 120 may determine whether execution screen images stored at an aspect ratio different from the size of the display (or a display area) currently being displayed exist.

In operation 1230, when the execution screen images stored at the aspect ratio different from the size of the display (or the display area) currently being displayed do not exist, the processor 120 may display the recent task list by the currently stored execution screen images.

In operation 1240, when the execution screen images stored at the aspect ratio different from the size of the display (or the display area) currently being displayed exist, the processor 120 may identify a configuration option of a display mode related to the recent task list in the electronic device 101.

In operation 1250, when the configuration option is configured as a window change function, the processor 120 may display the recent task list including an execution screen image including a scroll item in the case of an execution screen having an aspect ratio having an expanded size different from the current display size.

In operation 1260, when the configuration option is configured as a resizing display function, the processor 120 may display the recent task list, based on at least one of an execution screen having a first aspect ratio and an execution screen having a second aspect ratio.

In some cases, the processor 120 may configure a double display function together with the resizing display function.

For example, when the resizing display function is configured and an execution screen having an aspect ratio different from the current display size exists, the processor 120 may replace an execution screen image having a different aspect ratio with an execution screen image having an aspect ratio having the current display size and then display the recent task list (e.g., when the double display function is not configured together), or display both an execution screen image having the first aspect ratio and an execution screen image having the second aspect ratio in the recent task list (e.g., when the double display function is configured together).

In operation 1270, when the configuration option is configured as a last execution environment priority function, the processor 120 may display the recent task list, based on execution screen images generated at an aspect ratio at a time point of being captured.

In some cases, the processor 120 may configure the double display function together with the last execution environment priority function. The double display function may mean displaying execution screen images generated in an expanded state and execution screen images generated in a reduced state in the recent task list without post-processing, regardless of a resizing function.

In operation 1280, the processor 120 may receive an input for selecting an execution screen from the recent task list displayed through operations 1230 to 1270 for each condition.

In operation 1285, when an execution screen is selected from the recent task list displayed through operation 1230, the processor 120 may perform switching to the foreground and display the selected execution screen thereon.

When an execution screen is selected from the recent task list displayed through operation 1250, the processor 120 may perform switching to the foreground and display the selected execution screen thereon.

In operation 1290, when an execution screen is selected from the recent task list displayed through operation 1250, the processor 120 may determine whether the selected execution screen matches the current display size. When the selected execution screen matches the current display size, the processor 120 may proceed to operation 1285 to perform switching to the foreground and display the selected execution screen thereon.

In operation 1295, when an execution screen is selected from the recent task list displayed through operation 1270 or the execution screen selected in operation 1290 does not match the current display size, the processor 120 may change the current display size to a display size corresponding to an aspect ratio of the selected execution screen. After changing the display size, the processor 120 may proceed to operation 1285 to perform switching to the foreground and display the selected execution screen thereon.

According to certain embodiments, a method for controlling display of an application execution screen of an electronic device, comprises: in response to receiving a first input on a display in which an area exposed to an outside of the electronic device is changeable from a first size to a second size according to a sliding distance of a second housing with respect to a first housing, while the viewable area has the first size, receiving a first input for requesting a recent task list of at least one application being serviced, displaying a at least one execution screen image having a first aspect ratio for the first size corresponding to at least one application being serviced; and when the viewable area has the second size, displaying the at least one execution screen image having a second aspect ratio for the second size.

According to certain embodiments, the method further comprises: while the viewable area has the first size, at a time point at which the at least one application being serviced is switched from a foreground to a background, recording display size information and display data of an execution screen having the first size in the foreground, and capturing the execution screen having the first size.

According to certain embodiments, the method further comprises: detecting that the viewable area is changed from the first size to the second size; in response to receiving a second input requesting the recent task list, displaying, on the display, at least one execution screen image having the second aspect ratio, wherein the at least one execution screen image having the second aspect ratio replaces the at least one execution screen image having the first aspect ratio.

According to certain embodiments, the method further comprises: newly allocating a buffer for each of the at least one application being serviced, based on a change of the viewable area from the first size to the second size, generating display data of an execution screen corresponding to the second aspect ratio in the allocated buffer, and storing the at least one execution screen image having the second aspect ratio in the allocated buffer.

According to certain embodiments, the method further comprises: storing the at least one execution screen image having the second aspect ratio independently of the at least one execution screen image having the first aspect ratio.

According to certain embodiments, the method further comprises: in response to a second input requesting display of the recent task list while the viewable area has the second size, displaying the at least one execution screen image having the first aspect ratio and the at least one execution screen image having the second aspect ratio.

According to certain embodiments, the method further comprises: in response to a third input selecting the at least one execution screen having the first aspect ratio, controlling the viewable area to be changed from the second size to the first size, and switching an application corresponding to the selected execution screen image to a foreground and display, in the viewable area.

According to certain embodiments, the method further comprises: receive a third input for selecting one execution screen image included in the recent task list; when a size of the viewable area to the outside of the electronic device is different from display size information of the selected one execution screen image, automatically changing the viewable area of the display, in response to the third input, and switching an application corresponding to the selected one execution screen image to a foreground.

A method for controlling display of an application execution screen of an electronic device according to certain embodiments may include, in a display in which an viewable area to an outside of the electronic device is changed from a first size to a second size according to a sliding distance of a second housing with respect to a first housing, while the viewable area has the first size, receiving a first input for requesting a recent task list of at least one application being serviced, in response to receiving the first input, displaying the recent task list by an execution screen image having a first aspect ratio to correspond to the at least one application being serviced in the first size and while the viewable area has the second size, displaying the recent task list by an execution screen image having a second aspect ratio corresponding to the second size.

According to an embodiment, the displaying of the recent task list comprising the execution screen image having the first aspect ratio further comprises, at a time point at which the application being serviced is switched from a foreground to a background, recording display size information and display data of an execution screen having the first size in the foreground, and capturing the execution screen having the first size to store the captured execution screen as the execution screen image having the first aspect ratio.

According to an embodiment, the configuring and displaying of the execution screen image having the second aspect ratio corresponding to the second size further comprises, detecting that the viewable area is changed from the first size to the second size, and replacing the execution screen image having the first aspect ratio displayed in the recent task list with the execution screen image having the second aspect ratio, in response to the viewable area being changed to the second size.

According to an embodiment, the replacing with the execution screen image having the second aspect ratio further comprises newly allocating a buffer for each of the at least one application being serviced, generating display data of an execution screen corresponding to the second aspect ratio in the allocated buffer, and storing the execution screen image having the second aspect ratio by using the display data generated in the allocated buffer.

According to an embodiment, the configuring and displaying of the execution screen image having the second aspect ratio corresponding to the second size further comprises storing the execution screen image having the second aspect ratio independently of the execution screen image having the first aspect ratio.

According to an embodiment, the method comprises receiving, after the configuring of the execution screen image having the second aspect ratio corresponding to the second size, a second input for requesting display of the recent task list while the viewable area has the second size, and in response to the second input, including the execution screen image having the first aspect ratio and the execution screen image having the second aspect ratio in the recent task list and displaying same.

According to an embodiment, the method comprises receiving, after the including and displaying of the execution screen image having the first aspect ratio and the execution screen image having the second aspect ratio, a third input for selecting one execution screen image from the recent task list, identifying display size information corresponding to the execution screen image selected by the third input, and automatically changing the viewable area of the display, in response to the third input, in case that a size of the viewable area to the outside of the electronic device is different from the display size information of the selected execution screen image, and performing switching to a foreground and displaying, in the changed viewable area, an application corresponding to the selected execution screen image.

According to an embodiment, the recent task list may include at least one of a thumbnail image captured at a time point when the at least one application being serviced is switched from the foreground to the background, and an execution window capable of receiving a touch input, and the execution window may include the thumbnail image.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While one or more embodiments of the disclosure have been described with reference to the figures, it will be understood by those of ordinary skill in the art that various changes in form and details may be made therein without departing from the spirit and scope as defined by the following claims.

The invention claimed is:

1. An electronic device comprising:

a first housing;

a second housing slidably coupled with respect to the first housing;

a display in which a viewable area to a front surface of the electronic device is changeable from a first size having a first aspect ratio to a second size having a second aspect ratio according to a movement of the second housing with respect to the first housing;

a memory storing computer-executable instructions; and a processor configured to access the memory and execute the computer-executable instructions, wherein execution of the computer-executable instructions by the processor causes the processor to perform a plurality of operations, the plurality of operations comprising:

while the viewable area is maintained in the first size, in response to receiving a first input requesting a recent task list indicating at least one application currently running in background, displaying the recent task list comprising at least one execution screen image having the first aspect ratio and corresponding to the at least one application, wherein each of the at least one execution screen image having the first aspect ratio is an image captured at a time point when a corresponding one of the at least one application is switched from a foreground execution to a background execution;

in response to changing the viewable area from the first size to the second size, updating the recent task list by generating at least one execution screen image having the second aspect ratio corresponding to the at least one application; and while the viewable area has is maintained in the second size, displaying the updated recent task list.

2. The electronic device of claim 1, wherein the plurality of operations further comprises:

at a time point at which the at least one first application being serviced is switched from a foreground to a background while the viewable area has the first size, storing the execution screen of the at least one first application at the time point as a first execution screen;

wherein the first image corresponds to an execution screen of the first application.

3. The electronic device of claim 1, wherein the plurality of operations further comprises:

detecting that the viewable area is changed from the first size to the second size;

in response to detecting the viewable area is changed from the first size to the second size, displaying a second execution screen, wherein the second execution screen replaces the first execution screen.

4. The electronic device of claim 1, wherein the plurality of operations further comprises:

newly allocating a buffer for the at least one first application being serviced, based on a change of the viewable area from the first size to the second size, generating display data of a second execution screen of the at least one first application in the allocated buffer, and storing the second execution screen of the at least one first application in the allocated buffer.

5. The electronic device of claim 1, wherein the plurality of operations further comprises:

storing a second execution screen independently of a first execution screen.

6. The electronic device of claim 1, wherein the plurality of operations further comprises:

displaying in the recent task list, both a first execution screen and a second execution screen;

wherein the second image corresponds to an execution screen of the at least one first application in the foreground when the viewable area has the second size.

7. The electronic device of claim 6, wherein the plurality of operations further comprises:

in response to an input selecting the first execution screen, controlling the viewable area to be changed from the second size to the first size, and switching an application corresponding to the selected first execution screen to a foreground and display, in the viewable area.

8. The electronic device of claim 6, wherein the plurality of operations further comprises:

receiving an input for selecting the first execution screen included in the recent task list;

when a size of the viewable area is different from display size information related to the selected first execution screen, automatically changing the viewable area of the display, in response to the input, and switching an application corresponding to the selected first execution screen to a foreground.

9. The electronic device of claim 1, wherein the recent task list comprises at least one of a thumbnail image captured at a time point when the plurality of applications and the at least one first application, being serviced is switched from a foreground to a background, and an execution window capable of receiving a touch input, and wherein the execution window comprises the thumbnail image.

10. The electronic device of claim 9, wherein the plurality of operations further comprises:

while the viewable area has the second aspect ratio, displaying the recent task list, wherein the recent task list includes the execution window comprising a multi-window execution screen image;

in response to a first input for selecting a divided area of the multi-window execution screen image, changing the viewable area from the second aspect ratio to the first aspect ratio, and switching a second application being displayed in the selected divided area to the foreground; and in response to a second input for simultaneously selecting two divided areas of the multi-window execution screen image, switching applications being serviced in multiple windows to the foreground.

11. The electronic device of claim 9, wherein the plurality of operations further comprises:

when displaying the recent task list including a second execution screen having the second aspect ratio on the display, the viewable area of which has the first size, displaying at least a part of the second execution screen having the second aspect ratio in an execution window having the first aspect ratio, and including a scroll item in the execution window having the first aspect ratio.

12. The electronic device of claim 1, wherein the plurality of operations further comprises:

identifying a configuration option related to the recent task list; and when the configuration option is a window change function, replacing a first execution screen with a second execution screen, in response to the change from the display having the first size to the display having the second size, when the configuration option is a resizing display function, setting a recent task list comprising the first execution screen and the second execution screen, and when an aspect ratio of an execution screen selected from the recent task list is different from an aspect ratio of a size of the display currently being displayed, changing the display size according to the aspect ratio of the selected execution screen.

13. A method for controlling display of an application execution screen of an electronic device, wherein the electronic device comprise a display in which a viewable area to a front surface of the electronic device is changeable from a first size having a first aspect ratio to a second size having a second aspect ratio according to a movement of a second housing with respect to a first housing;

the method comprising:

while the viewable area is maintained in the first size, in response to receiving a first input requesting a recent task list indicating at least one application currently running in background, displaying the recent task list comprising at least one execution screen image having the first aspect ratio and corresponding to the at least one application, wherein each of the at least one execution screen image having the first aspect ratio is an image captured at a time point when a corresponding one of the at least one application is switched from a foreground execution to a background execution;

in response to changing a viewable area of the display from a first size to a second size, updating the recent task list by generating at least one execution screen image having the second aspect ratio corresponding to the at least one application; and while the viewable area is maintained in the second size, displaying the updated recent task list.

14. The method of claim 13, further comprising:

at a time point at which the at least one first application being serviced is switched from a foreground to a background while the viewable area has the first size, storing the execution screen of the at least one first application at the first point as a first execution screen;

wherein the first image corresponds to an execution screen of the first application.

15. The method of claim 13, further comprising:

detecting that the viewable area is changed from the first size to the second size;

in response to detecting the viewable area is changed from the first size to the second size, displaying a second execution screen, wherein the second execution screen replaces a first execution screen.

16. The method of claim 13, further comprising:

newly allocating a buffer for the at least one first application being serviced, based on a change of the viewable area from the first size to the second size, generating display data of a second execution screen of the at least one first application in the allocated buffer, and storing the second execution screen of the at least one first application in the allocated buffer.

17. The method of claim 13, further comprising:

storing a second execution screen independently of a first execution screen.

18. The method of claim 13, further comprising:

displaying, in the recent task list, both a first execution screen and a second execution screen;

wherein the second image corresponds to an execution screen of the at least one first application in the foreground when the viewable area has the second size.

19. The method of claim 18, further comprising:

in response to an input selecting the first execution screen, controlling the viewable area to be changed from the second size to the first size, and switching an application corresponding to the selected first execution screen to a foreground and display, in the viewable area.

20. The method of claim 18, further comprising:

receiving an input for selecting the first execution screen included in the recent task list;

when a size of the viewable area is different from display size information related to the selected first execution screen, automatically changing the viewable area of the display, in response to the input, and switching an application corresponding to the selected first execution screen to a foreground.

* * * * *